United States Patent
Long

(10) Patent No.: US 12,467,656 B1
(45) Date of Patent: *Nov. 11, 2025

(54) DEVICE FOR CONTROLLING HEATING VENTILATION AND AIR CONDITIONING (HVAC) SYSTEMS

(71) Applicant: ECLIMAI LIMITED, Dublin (IE)

(72) Inventor: Eoin Long, Dublin (IE)

(73) Assignee: ECLIMAI LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/956,653

(22) Filed: Nov. 22, 2024

Related U.S. Application Data

(60) Provisional application No. 63/685,332, filed on Aug. 21, 2024.

(51) Int. Cl.
| | |
|---|---|
| *F24F 11/63* | (2018.01) |
| *F24F 11/89* | (2018.01) |
| *F24F 110/10* | (2018.01) |
| *F24F 110/50* | (2018.01) |
| *F24F 120/10* | (2018.01) |

(52) U.S. Cl.
CPC .............. *F24F 11/89* (2018.01); *F24F 11/63* (2018.01); *F24F 2110/10* (2018.01); *F24F 2110/50* (2018.01); *F24F 2120/10* (2018.01)

(58) Field of Classification Search
None
See application file for complete search history.

(56) References Cited

U.S. PATENT DOCUMENTS

| | | | |
|---|---|---|---|
| 2016/0054018 A1* | 2/2016 | Motodani | F24F 11/46 700/276 |
| 2016/0305678 A1 | 10/2016 | Pavlovski et al. | |
| 2017/0138624 A1* | 5/2017 | Kriz | F24F 11/00 |
| 2018/0058711 A1* | 3/2018 | Taplin | G05D 23/1931 |
| 2018/0195752 A1* | 7/2018 | Sasaki | F24F 11/64 |
| 2019/0310589 A1* | 10/2019 | Gervais | G05B 13/027 |
| 2021/0088244 A1* | 3/2021 | Kim | F24F 11/64 |
| 2021/0190355 A1* | 6/2021 | Tokudi | F24F 11/62 |
| 2021/0200174 A1* | 7/2021 | Sridharan | G05B 17/02 |
| 2021/0208002 A1* | 7/2021 | Meggers | G01J 5/07 |
| 2021/0239534 A1* | 8/2021 | Shayne | F24F 11/80 |
| 2024/0142930 A1* | 5/2024 | Pelski | G05B 15/02 |

* cited by examiner

*Primary Examiner* — Kamini S Shah
*Assistant Examiner* — Istiaque Ahmed
(74) *Attorney, Agent, or Firm* — Shore IP Group, PLLC; Sean R. Wilsusen

(57) ABSTRACT

A system for controlling heating, ventilation, and air conditioning (HVAC) systems includes a camera that captures images including temperature data for the space. An image analysis module is configured to receive the images and analyze the images to determine a current temperature in the space. A computer is configured to determine a future temperature in the space and determine an amount of heating or cooling output needed to maintain a predetermined temperature in the space. A controller is configured to communicate with a heating, ventilation, and air conditioning (HVAC) system. The HVAC system is configured to control the temperature in the space by heating or cooling the space. The controller is configured to transmit the determined amount of heating or cooling output needed to maintain the predetermined temperature in the space to the HVAC system to maintain the predetermined temperature in the space.

13 Claims, 25 Drawing Sheets

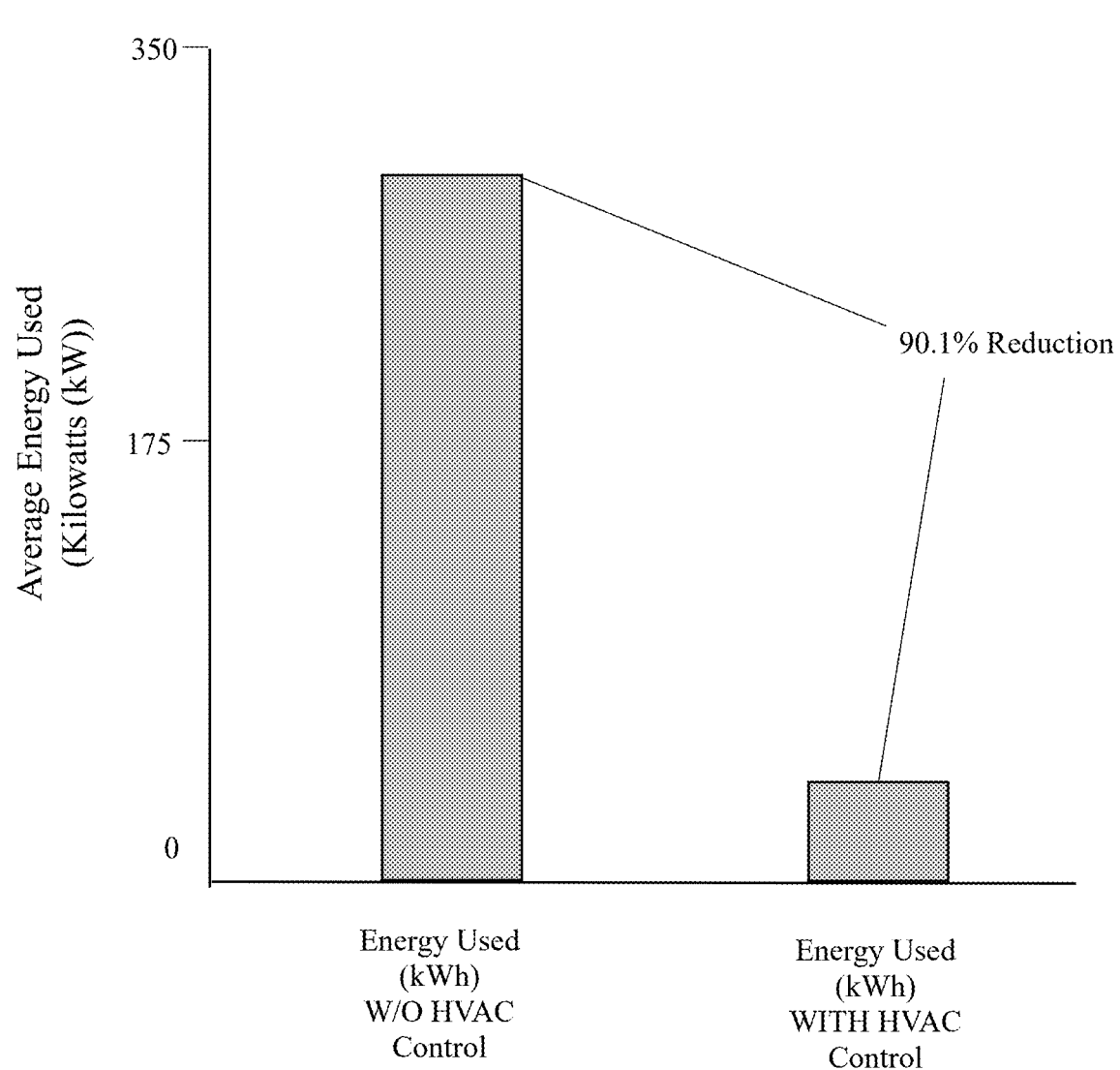

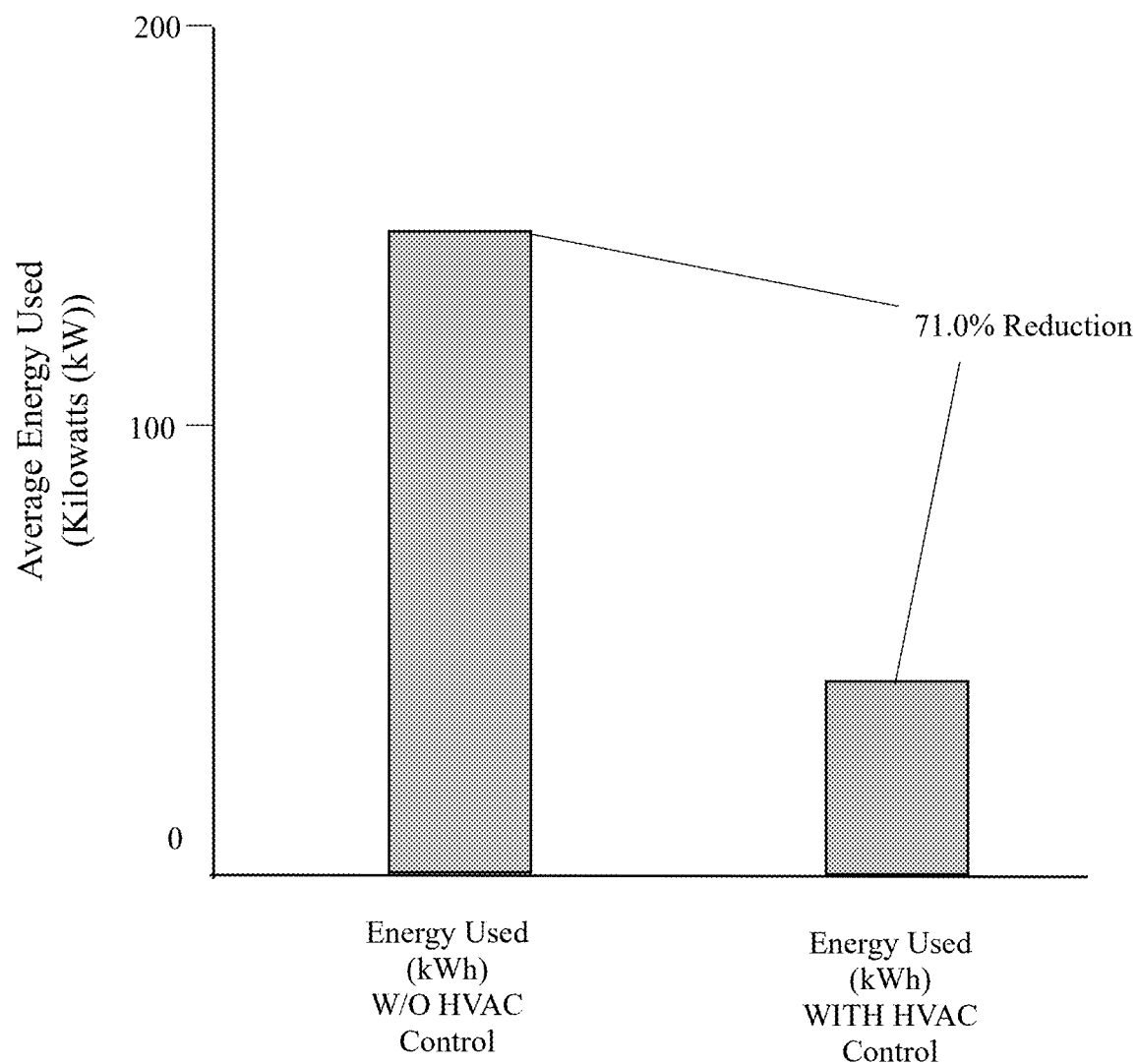

DEVICE FOR CONTROLLING HEATING VENTILATION AND AIR CONDITIONING (HVAC) SYSTEMS

CROSS REFERENCE TO RELATED APPLICATION

The present U.S. Non-Provisional Patent Application claims priority to U.S. Provisional Patent Application No. 63/685,332, filed on Aug. 21, 2024, the entire contents of which are incorporated by reference herein.

FIELD

The present disclosure relates to HVAC systems, and more particularly, to a device, system, and method for controlling HVAC systems.

BACKGROUND

Heating, ventilation, and air conditioning (HVAC) refers to the use of various technologies to control the temperature, humidity, and purity of the air in an enclosed space, such as homes, offices, or commercial buildings. HVAC systems provide thermal comfort and acceptable indoor air quality for such spaces. HVAC systems generally operate based on the principles of thermodynamics, fluid mechanics, and heat transfer.

However, the output of HVAC systems can be highly variable and difficult to accurately control. Therefore, there remains an unmet need for a highly efficient control system for HVAC systems to maximize thermal comfort, reduce energy costs, and maximize overall efficiency of such systems.

SUMMARY

Provided in accordance with aspects of the present disclosure is a device for heating, ventilation, and air conditioning (HVAC) systems including a camera configured to capture a number of images of a space. The images include temperature data for the space. An image analysis module is configured to receive the images and analyze the images to determine a current temperature in the space. A computer is in communication with the image analysis module. The computer includes at least one processor and at least one memory in communication with the processor(s). The memory stores computer instructions configured to instruct the processor to determine a future temperature in the space relative to the current temperature and determine an amount of heating or cooling output needed to maintain a predetermined temperature in the space. A controller is in communication with the computer. The controller is configured to communicate with a heating, ventilation, and air conditioning (HVAC) system. The HVAC system is configured to control the temperature in the space by heating or cooling the space. The controller is configured to transmit the determined amount of heating or cooling output needed to maintain the predetermined temperature in the space to the HVAC system to maintain the predetermined temperature in the space.

In an aspect of the present disclosure, a temperature sensor is in communication with the computer. The temperature sensor is configured to directly measure the current temperature in the space.

In an aspect of the present disclosure, the temperature sensor is a digital temperature sensor, an analog temperature sensor, a thermocouple, a resistance temperature detector, a USB temperature sensor, a Wi-Fi® temperature sensor, or a Bluetooth® temperature sensor.

In an aspect of the present disclosure, an air analysis device is in communication with the computer. The air analysis device is configured to analyze at least one of particulate matter, carbon dioxide, carbon monoxide, nitrogen dioxide, ozone, volatile organic compounds, humidity, temperature, formaldehyde, radon, air pressure, and/or smoke.

In an aspect of the present disclosure, the image analysis module is configured to detect a person or people occupying the space and determine an amount of thermogenesis for the person or people occupying the space.

In an aspect of the present disclosure, the computer instructions are configured to instruct the processor to receive the amount of thermogenesis determined by the image analysis module, determine the future temperature in the space relative to the current temperature based on the amount of thermogenesis determined by the image analysis module, and determine the amount of heating or cooling output needed to maintain the predetermined temperature in the space based on the amount of thermogenesis determined by the image analysis module.

In an aspect of the present disclosure, a machine learning model is in communication with the computer and/or the image analysis module. The machine learning model includes an artificial neural network configured to analyze the images captured by the camera.

In an aspect of the present disclosure, the machine learning model includes a convolutional neural network (CNN) in communication with the artificial neural network. The CNN is configured to parse the images to determine the current or the future temperature in the space.

In an aspect of the present disclosure, the image analysis module is configured to detect an object or objects occupying the space, determine an amount of heat released by the object or objects occupying the space, and determine an amount of heat absorbed by the object or objects occupying the space.

In an aspect of the present disclosure, the computer instructions are configured to instruct the processor to receive the amount of heat released by the object or objects occupying the space and the amount of heat absorbed by the object or objects occupying the space determined by the image analysis module, determine the future temperature in the space relative to the current temperature based on the amount of heat released by the object or objects occupying the space and the amount of heat absorbed by the object or objects occupying the space, and determine the amount of heating or cooling output needed to maintain the predetermined temperature in the space based on the amount of heat released by the object or objects occupying the space and the amount of heat absorbed by the object or objects occupying the space.

In an aspect of the present disclosure, the computer employs the artificial neural network of the machine learning model to determine the amount of thermogenesis for the person or people occupying the space. The machine learning model is trained to determine the amount of thermogenesis for the person or people occupying the space by training the machine learning model on a first data set to determine the amount of heating or cooling output needed to maintain the predetermined temperature in the space based on the amount of thermogenesis for the person or people occupying the space. The machine learning model is further trained by iteratively training the machine learning model on at least a second data set and a third data set to determine the amount of heating or cooling output needed to maintain the predetermined temperature in the space based on the amount of thermogenesis for the person or people occupying the space. Iteratively training the machine learning model on at least the second data set and the third data set increases predictive accuracy of the machine learning model with respect to training the machine learning model on the first data set. The amount of heating or cooling output needed to maintain the predetermined temperature in the space is determined by employing the iteratively trained machine learning model.

In an aspect of the present disclosure, the camera includes a camera configured to capture video images, and the images are part of a video image.

In an aspect of the present disclosure, the image analysis module is configured to determine the current temperature of the space in real-time.

In an aspect of the present disclosure, the camera includes at least one of a thermal imaging camera, an infrared camera, a thermographic camera, a laser thermometer camera, a radiometric camera, or a thermal sensor camera.

In an aspect of the present disclosure, the device includes a wireless transmitter configured to connect the controller with the HVAC system.

In an aspect of the present disclosure, the controller is configured to communicate with the HVAC system by a Wi-Fi®, Bluetooth®, or cellular network connection.

In an aspect of the present disclosure, the HVAC system includes a wireless transmitter configured to communicate with the controller.

In an aspect of the present disclosure, a wireless transmitter is configured to communicate with a cloud-based server.

In an aspect of the present disclosure, the wireless transmitter is configured to communicate with the cloud-based server through an internet or cellular network connection.

Provided in accordance with aspects of the present disclosure is a system for controlling heating, ventilation, and air conditioning (HVAC) systems. The system includes a camera configured to capture a number of images of a space. The images captured by the camera include temperature data for the space. A control system is in communication with the camera. The control system includes an image analysis module. The image analysis module is configured to receive the images and analyze the images to determine a current temperature in the space. The control system includes a computer in communication with the image analysis module. The computer includes at least one processor and at least one memory in communication with the processor(s). The memory stores computer instructions configured to instruct the processor to determine a future temperature in the space relative to the current temperature and determine an amount of heating or cooling output needed to maintain a predetermined temperature in the space. The control system includes a controller in communication with the computer. The system includes a heating, ventilation, and air conditioning (HVAC) system in communication with the controller. The HVAC system is configured to control the temperature in the space by heating or cooling the space. The controller is configured to transmit the determined amount of heating or cooling output needed to maintain the predetermined temperature in the space to the HVAC system to maintain the predetermined temperature in the space.

In an aspect of the present disclosure, the system includes a temperature sensor in communication with the computer. The temperature sensor is configured to directly measure the current temperature in the space.

In an aspect of the present disclosure, the temperature sensor is a digital temperature sensor, an analog temperature sensor, a thermocouple, a resistance temperature detector, a USB temperature sensor, a Wi-Fi® temperature sensor, or a Bluetooth® temperature sensor.

In an aspect of the present disclosure, the system includes an air analysis device in communication with the computer. The air analysis device is configured to analyze at least one of particulate matter, carbon dioxide, carbon monoxide, nitrogen dioxide, ozone, volatile organic compounds, humidity, temperature, formaldehyde, radon, air pressure, or smoke.

In an aspect of the present disclosure, the image analysis module is configured to detect a person or people occupying the space and determine an amount of thermogenesis for the person or people occupying the space.

In an aspect of the present disclosure, the computer instructions of the system are configured to instruct the processor to receive the amount of thermogenesis determined by the image analysis module, determine the future temperature in the space relative to the current temperature based on the amount of thermogenesis determined by the image analysis module, and determine the amount of heating or cooling output needed to maintain the predetermined temperature in the space based on the amount of thermogenesis determined by the image analysis module.

In an aspect of the present disclosure, the system includes a machine learning model in communication with the computer and/or the image analysis module. The machine learning model includes an artificial neural network configured to analyze the images.

In an aspect of the present disclosure, the machine learning model includes a convolutional neural network (CNN) in communication with the artificial neural network. The CNN is configured to parse the images to determine the current or the future temperature in the space.

In an aspect of the present disclosure, the image analysis module of the system is configured to detect an object or objects occupying the space, determine an amount of heat released by the object or objects occupying the space, and determine an amount of heat absorbed by the object or objects occupying the space.

In an aspect of the present disclosure, the computer instructions of the system are configured to instruct the processor to receive the amount of heat released by the object or objects occupying the space and the amount of heat absorbed by the object or objects occupying the space determined by the image analysis module, determine the future temperature in the space relative to the current temperature based on the amount of heat released by the object or objects occupying the space and the amount of heat absorbed by the object or objects occupying the space, and determine the amount of heating or cooling output needed to maintain the predetermined temperature in the space based on the amount of heat released by the object or objects occupying the space and the amount of heat absorbed by the object or objects occupying the space.

In an aspect of the present disclosure, the camera is configured to capture video images. The images captured by the camera are part of a video image.

In an aspect of the present disclosure, the image analysis module is configured to determine the current temperature of the space in real-time.

In an aspect of the present disclosure, the camera includes at least one of a thermal imaging camera, an infrared camera, a thermographic camera, a laser thermometer camera, a radiometric camera, or a thermal sensor camera.

In an aspect of the present disclosure, the system includes a wireless transmitter configured to connect the controller with the HVAC system.

In an aspect of the present disclosure, the controller of the system is configured to communicate with the HVAC system by a Wi-Fi®, Bluetooth®, or cellular network connection.

In an aspect of the present disclosure, the HVAC system includes a wireless transmitter configured to communicate with the controller.

In an aspect of the present disclosure, the system includes a wireless transmitter configured to communicate with a cloud-based server.

In an aspect of the present disclosure, the wireless transmitter of the system is configured to communicate with the cloud-based server through an internet or cellular network connection.

Provided in accordance with aspects of the present disclosure is a computer-implemented method for controlling heating, ventilation, and air conditioning (HVAC) systems including capturing, by a camera, a number of images of a space. The images captured by the camera include temperature data for the space. The method includes receiving, at an image analysis module, the images captured by the camera. The method includes analyzing, by the image analysis module, the images to determine a current temperature in the space. The method includes determining, by a computer including at least one processor and at least one memory, a future temperature in the space relative to the current temperature. The method includes determining, by the computer, an amount of heating or cooling output needed to maintain a predetermined temperature in the space. The method includes communicating, by a controller, with a heating, ventilation, and air conditioning (HVAC) system. The HVAC system is configured to control the temperature in the space by heating or cooling the space. The method includes transmitting, by the controller, the determined amount of heating or cooling output needed to maintain the predetermined temperature in the space to the HVAC system to maintain the predetermined temperature in the space. The method includes outputting, by the HVAC system, the determined amount of heating or cooling output to maintain the predetermined temperature in the space.

In an aspect of the present disclosure, the method includes directly measuring, by a temperature sensor in communication with the computer, the current temperature in the space.

In an aspect of the present disclosure, the temperature sensor is a digital temperature sensor, an analog temperature sensor, a thermocouple, a resistance temperature detector, a USB temperature sensor, a Wi-Fi® temperature sensor, or a Bluetooth® temperature sensor.

In an aspect of the present disclosure, the method includes analyzing, by an air analysis device in communication with the computer, at least one of particulate matter, carbon dioxide, carbon monoxide, nitrogen dioxide, ozone, volatile organic compounds, humidity, temperature, formaldehyde, radon, air pressure, or smoke.

In an aspect of the present disclosure, the method includes detecting, by the image analysis module, a person or people occupying the space. The method includes determining, by the image analysis module, an amount of thermogenesis for the person or people occupying the space.

In an aspect of the present disclosure, the method includes receiving, by the computer, the amount of thermogenesis determined by the image analysis module. The method includes determining, by the computer, the future temperature in the space relative to the current temperature based on the amount of thermogenesis determined by the image analysis module. The method includes determining, by the computer, the amount of heating or cooling output needed to maintain the predetermined temperature in the space based on the amount of thermogenesis determined by the image analysis module.

In an aspect of the present disclosure, a machine learning model is in communication with the computer and/or the image analysis module. The machine learning model includes an artificial neural network that analyzes the images and determines the future temperature in the space.

In an aspect of the present disclosure, the machine learning model includes a convolutional neural network (CNN) in communication with the artificial neural network. The CNN parses the images to determine the current or the future temperature in the space.

In an aspect of the present disclosure, the method includes detecting, by the image analysis module, an object or objects occupying the space. The method includes determining, by the image analysis module, an amount of heat released by the object or objects occupying the space. The method includes determining, by the image analysis module, an amount of heat absorbed by the object or objects occupying the space.

In an aspect of the present disclosure, the method includes receiving, by the computer, the amount of heat released by the object or objects occupying the space and the amount of heat absorbed by the object or objects occupying the space determined by the image analysis module. The method includes determining, by the computer, the future temperature in the space relative to the current temperature based on the amount of heat released by the object or objects occupying the space and the amount of heat absorbed by the object or objects occupying the space. The method includes determining, by the computer, the amount of heating or cooling output needed to maintain the predetermined temperature in the space based on the amount of heat released by the object or objects occupying the space and the amount of heat absorbed by the object or objects occupying the space.

In an aspect of the present disclosure, the camera includes a camera configured to capture video images, and the images captured by the camera are captured as part of a video image.

In an aspect of the present disclosure, the method includes determining, by the image analysis module, the current temperature of the space in real-time.

In an aspect of the present disclosure, the camera employed in the method includes at least one of a thermal imaging camera, an infrared camera, a thermographic camera, a laser thermometer camera, a radiometric camera, or a thermal sensor camera.

In an aspect of the present disclosure, the method includes communicating between the controller and the HVAC system through a wireless transmitter.

In an aspect of the present disclosure, the controller communicates with the HVAC system by a Wi-Fi®, Bluetooth®, or cellular network connection.

In an aspect of the present disclosure, the HVAC system includes a wireless transmitter, and the HVAC system communicates with the controller through the wireless transmitter.

In an aspect of the present disclosure, the computer communicates with a cloud-based server through the wireless transmitter.

In an aspect of the present disclosure, the wireless transmitter communicates with the cloud-based server through an internet or cellular network connection.

BRIEF DESCRIPTION OF THE DRAWINGS

Various aspects and features of the present disclosure are described hereinbelow with reference to the drawings wherein:

FIG. 19 illustrates exemplary data comparing energy usage with and without HCAC control during overnight usage according to aspects of the present disclosure;

FIG. 21 illustrates exemplary data comparing energy usage with and without HCAC control during daily usage according to aspects of the present disclosure.

DETAILED DESCRIPTION

Figure 1:
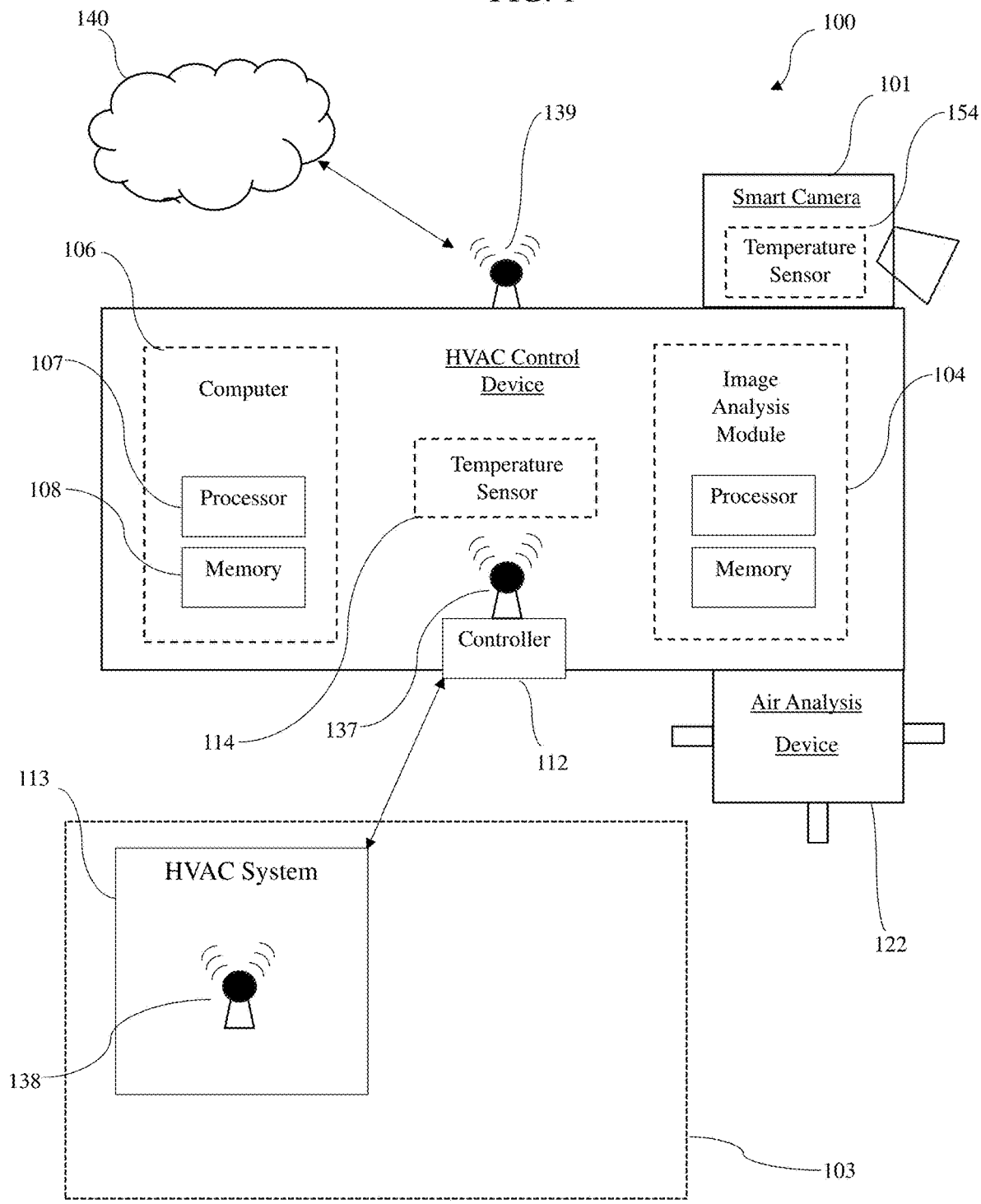
FIG. 1 is a schematic diagram of a device for controlling an HVAC system according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The phrases "neural network" and "artificial neural network" and the abbreviation ANN (for artificial neural network) may be used interchangeably herein.

The devices, systems, and methods described herein are designed for building owners to manage and optimize their building environments. The devices, systems, and methods may utilize artificial intelligence to monitor office spaces, analyze environmental and occupancy data, and dynamically adjust heating, ventilation, and air conditioning (HVAC) systems (see, e.g., HVAC system 113 in FIG. 1, or HVAC system 213 in FIG. 2, or HVAC system 313 in FIG. 3, or HVAC system 413 in FIG. 4, or HVAC system 513 in FIG. 5, or HVAC system 613 in FIG. 6) to maintain optimal working conditions, maximize comfort, increase energy efficiency, and reduce energy usage.

Users may provide building location (e.g., geographic location and region of use to determine average temperatures and environmental characteristics of where a building is located), the number of occupants or residents or a space (see, e.g., space 103 in FIG. 1, or space 203 in FIG. 2, or space 303 in FIG. 3, or space 403 in FIG. 4, or space 503 in FIG. 5, or space 603 in FIG. 6), the number of working hours (e.g., hours during which a building is open, and/or the number of people that generally occupy a space at various times), and desired temperature settings (e.g., 70 degrees Fahrenheit).

The devices, systems, and methods described herein may employ occupancy monitoring and analysis. Data collection may employ cameras (see, e.g., camera 101 in FIG. 1, or camera 201 in FIG. 2, or camera 301 in FIG. 3, or camera 401 in FIG. 4, or camera 501 in FIG. 5, or camera 601 in FIG. 6) strategically placed within office spaces to capture video feeds. These video feeds may be continuously monitored to track the number of occupants and their activities within the rooms or spaces.

As an example, object detection and tracking may employ the YOLOv8 (You Only Look Once version 8) algorithm, which is an advanced deep learning featuring high-speed and accurate object detection capabilities.

YOLOv8 processes the video feeds in real-time, identifying and tracking individuals within the monitored spaces.

Activity recognition may include analyzing occupant activity, such as sitting, standing, moving, and other actions that may influence the room's thermal environment. This analysis can be employed for calculating the thermogenesis effect, which is the heat generated by human bodies due to their activities.

The thermogenesis calculation may include estimating the amount of heat produced by individuals based on their detected activities. This thermogenesis data can be combined with the number of occupants to provide an accurate assessment of the thermal load within the space.

Figure 2:
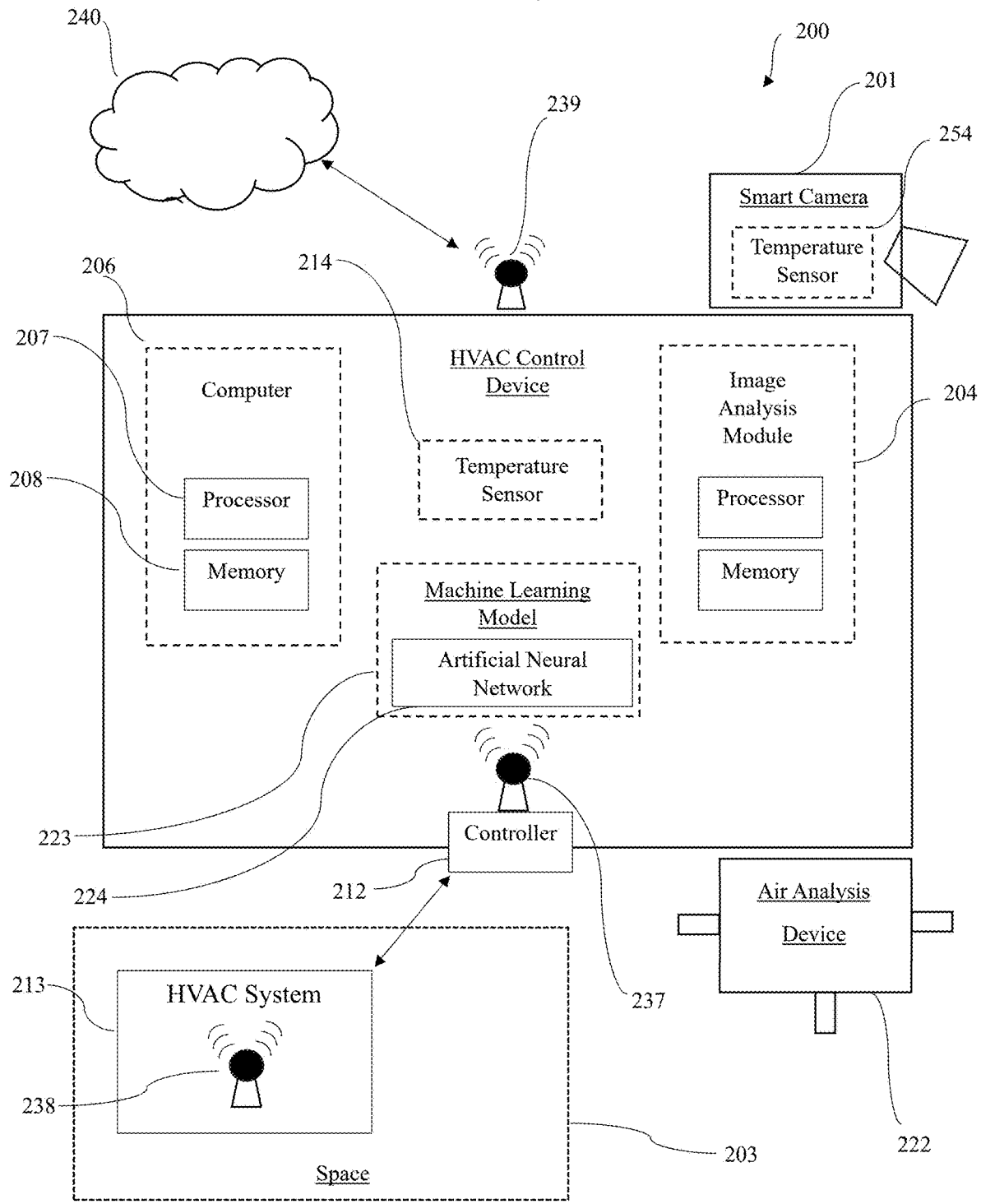
FIG. 2 is a schematic diagram of another device for controlling an HVAC system according to aspects of the present disclosure.
Figure 3:
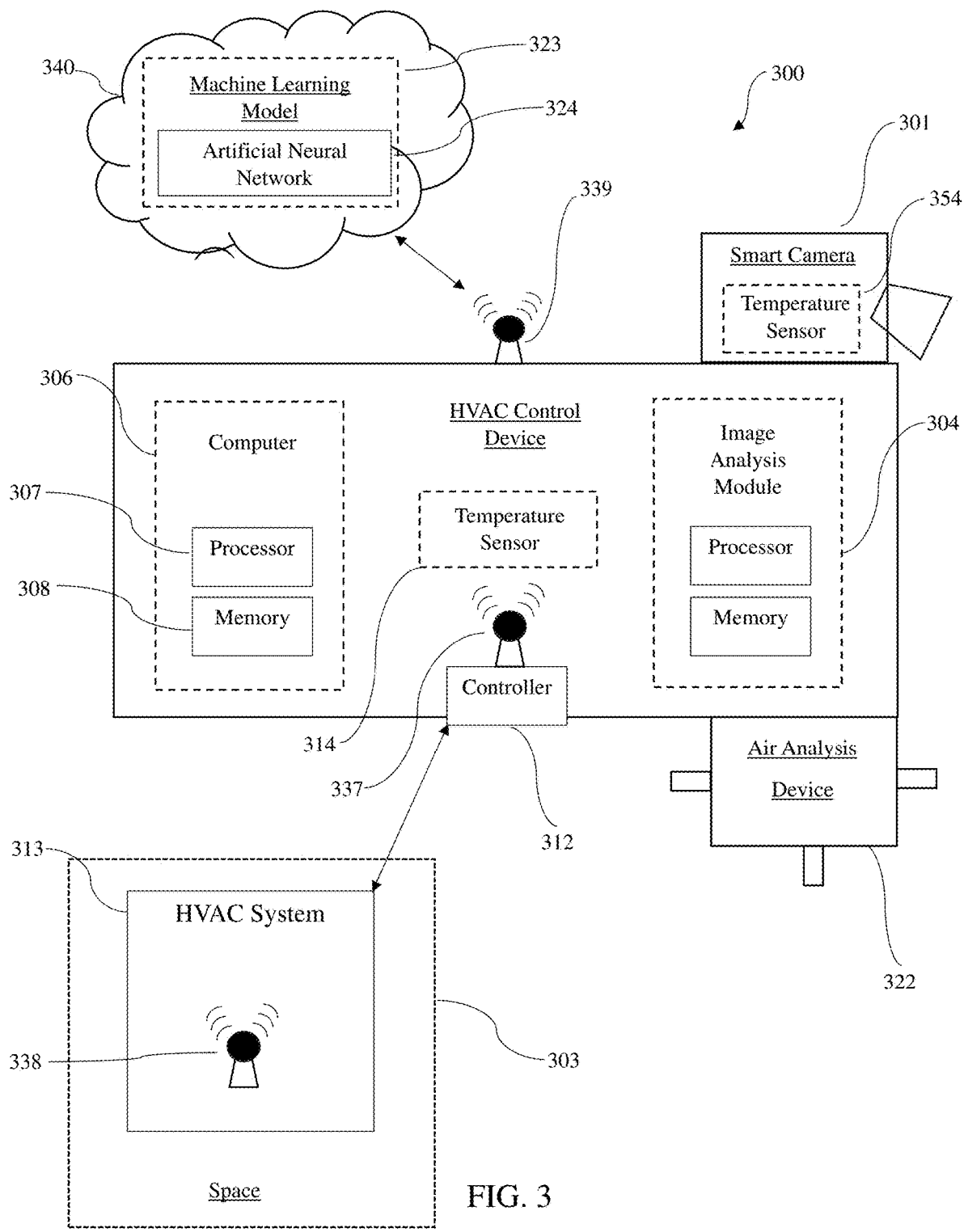
FIG. 3 is a schematic diagram of another device for controlling an HVAC system according to aspects of the present disclosure.
Figure 4:
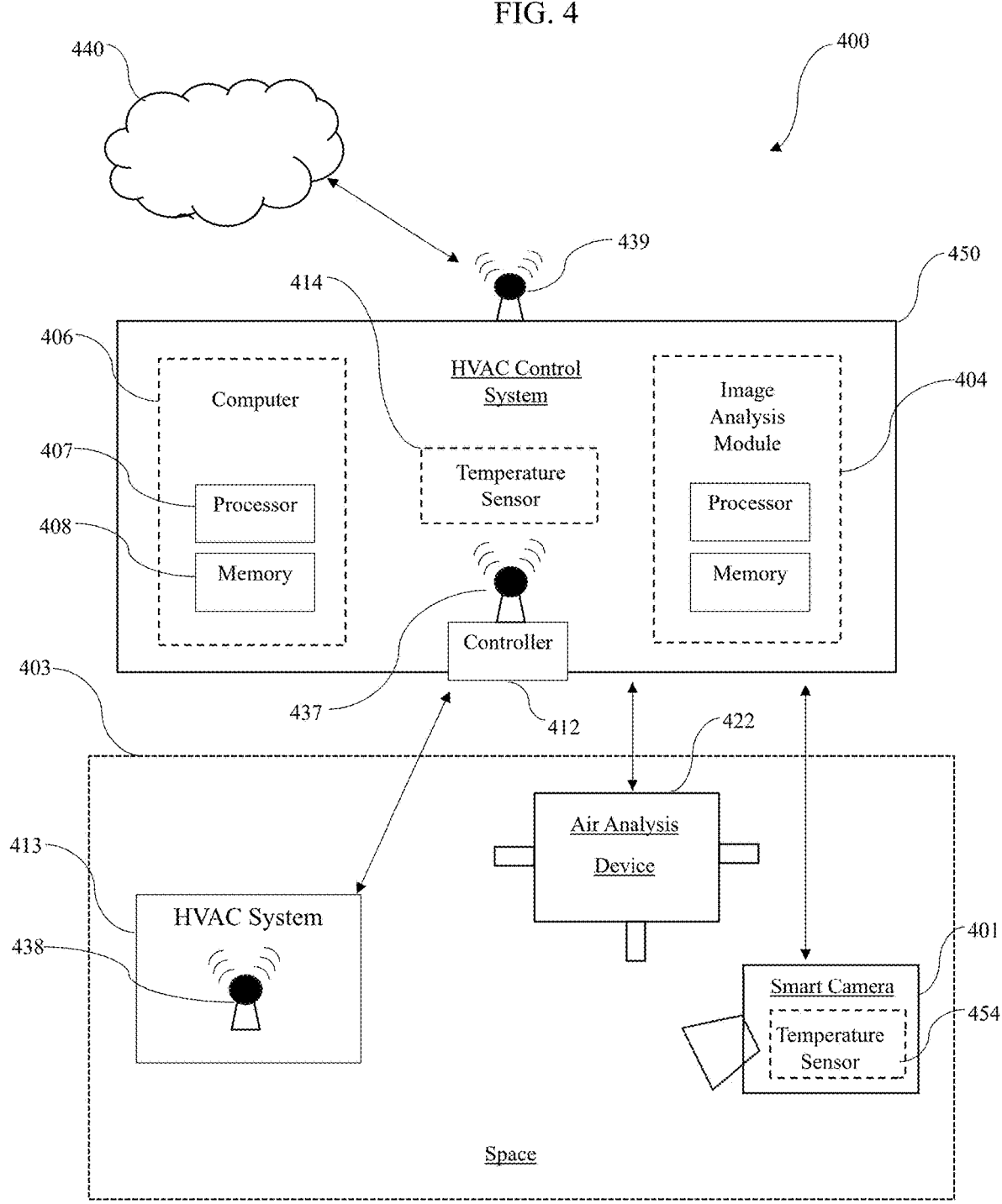
FIG. 4 is a schematic diagram of a system for controlling an HVAC system according to aspects of the present disclosure.
Figure 5:
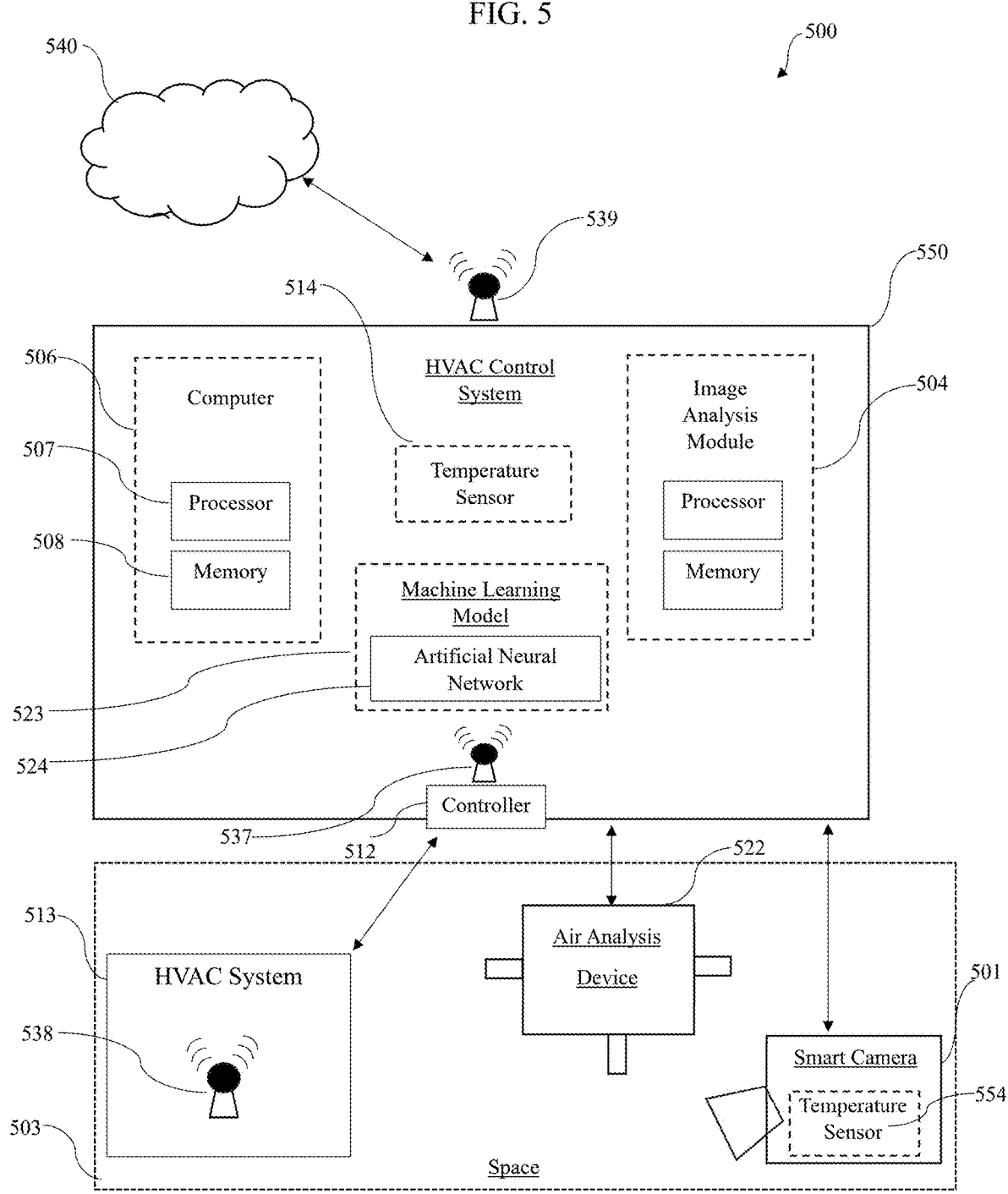
FIG. 5 is a schematic diagram of another system for controlling an HVAC system according to aspects of the present disclosure.
Figure 6:
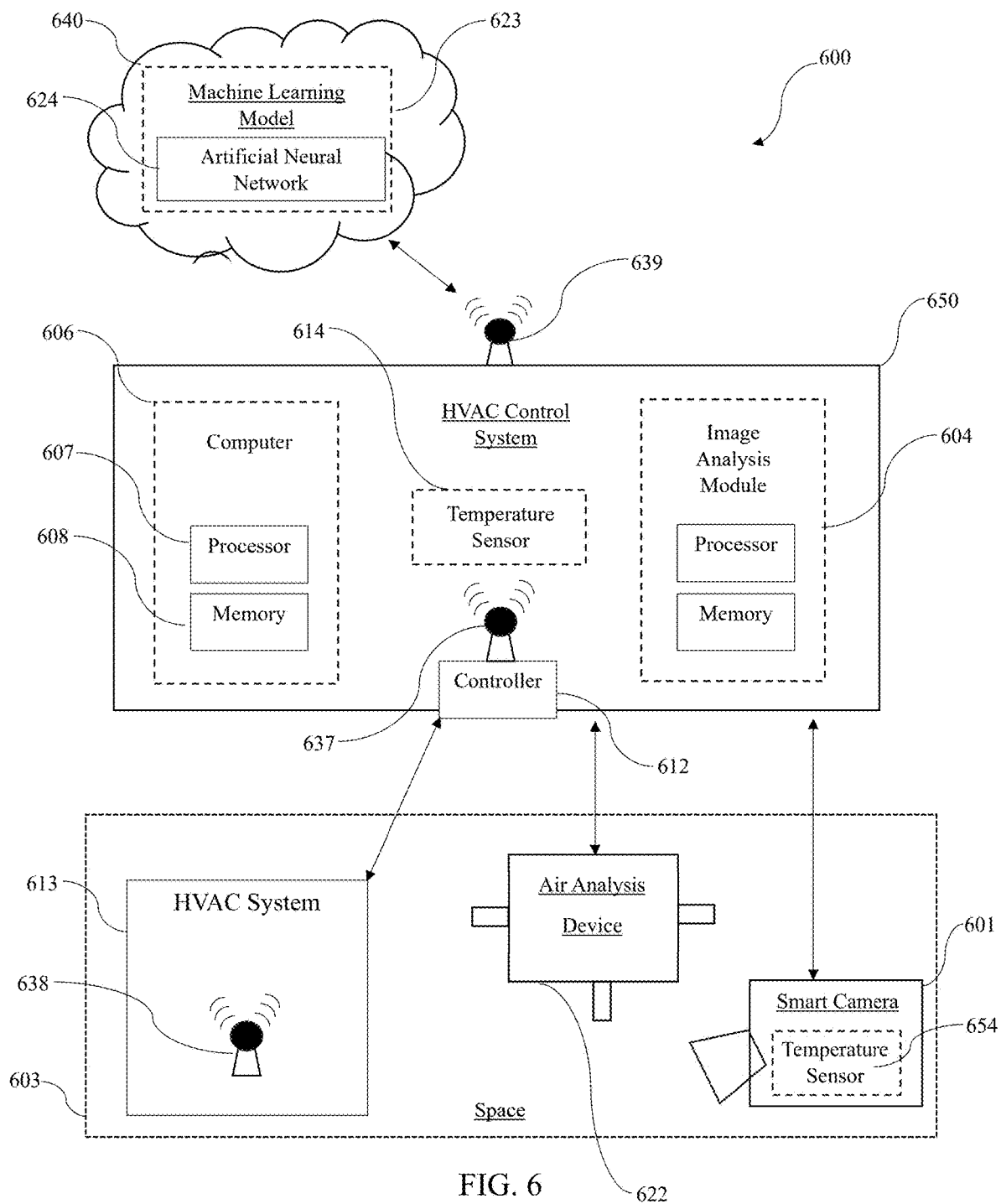
FIG. 6 is a schematic diagram of another system for controlling an HVAC system according to aspects of the present disclosure.

HVAC integration and control may include:

A BACNET Protocol in which the devices and systems described herein interface with the building's HVAC system (see, e.g., HVAC system 113 in FIG. 1, or HVAC system 213 in FIG. 2, or HVAC system 313 in FIG. 3, or HVAC system 413 in FIG. 4, or HVAC system 513 in FIG. 5, or HVAC system 613 in FIG. 6) using the BACNET (Building Automation and Control Network) protocol, which is a communication protocol for building automation and control networks. This integration allows the devices and systems described herein to send commands to HVAC systems, such as Mitsubishi® air conditioners, to adjust the temperature settings;

Dynamic Temperature Adjustment in which the devices and system use the thermogenesis data and desired temperature settings provided by the building owner to dynamically adjust the HVAC system (see, e.g., HVAC system 113 in FIG. 1, or HVAC system 213 in FIG. 2, or HVAC system 313 in FIG. 3, or HVAC system 413 in FIG. 4, or HVAC system 513 in FIG. 5, or HVAC system 613 in FIG. 6). The adjustments can be made in real-time, ensuring that the indoor environment remains within the optimal temperature range for comfort and energy efficiency;

Energy efficiency is achieved by precisely controlling the HVAC system (see, e.g., HVAC system 113 in FIG. 1, or HVAC system 213 in FIG. 2, or HVAC system 313 in FIG. 3, or HVAC system 413 in FIG. 4, or HVAC system 513 in FIG. 5, or HVAC system 613 in FIG. 6) based on real-time occupancy and activity data. The devices and systems reduce unnecessary heating or cooling when rooms are unoccupied or when the thermal load decreases, leading to substantial energy savings.

As an example, the algorithms described herein process images in a single pass, providing real-time detection and classification. The algorithms divide the input image into a grid and predicts bounding boxes and class probabilities for each grid cell, making it highly efficient and accurate for real-time applications.

The cameras (see, e.g., camera 101 in FIG. 1, or camera 201 in FIG. 2, or camera 301 in FIG. 3, or camera 401 in FIG. 4, or camera 501 in FIG. 5, or camera 601 in FIG. 6) employed by the devices, systems, and methods described herein have sufficient resolution to capture detailed video feeds for accurate object detection. A robust computational infrastructure, including GPUs, can be employed for running the algorithms described herein and processing real-time video feeds (see, e.g., video files 1138 in FIG. 11, or video files 1238 in FIG. 12).

The HVAC integration employs compatible HVAC systems that support, for example, the BACNET protocol for seamless communication and control.

Referring to FIGS. 1 to 3, a device (see, e.g., HVAC control device 100 in FIG. 1, or HVAC control device 200 in FIG. 2, or HVAC control device 300 in FIG. 3) for heating, ventilation, and air conditioning (HVAC) systems includes a camera (see, e.g., camera 101 in FIG. 1, or camera 201 in FIG. 2, or camera 301 in FIG. 3) configured to capture a number of images of a space (see, e.g., space 103 in FIG. 1, or space 203 in FIG. 2, or space 303 in FIG. 3). The images include temperature data for the space (e.g., 103, 203, and/or 303). An image analysis module (see, e.g., image analysis module 104 in FIG. 1, or image analysis module 204 in FIG. 2, or image analysis module 304 in FIG. 3) is configured to receive the images and analyze the images to determine a current temperature in the space (e.g., 103, 203, and/or 303). A computer (see, e.g., computer 106 in FIG. 1, or computer 206 in FIG. 2, or computer 306 in FIG. 3) is in communication with the image analysis module (e.g., 104, 204, and/or 304). The computer (e.g., 106, 206, 306) includes at least one processor (see, e.g., processor 107 in FIG. 1, or processor 207 in FIG. 2, or processor 307 in FIG. 3) and at least one memory (see, e.g., memory 108 in FIG. 1, or memory 208 in FIG. 2, or memory 308 in FIG. 3) in communication with the processor(s) (e.g., 107, 207, and/or 307). The memory (e.g., 108, 208, and/or 308 stores computer instructions configured to instruct the processor (e.g., 107, 207, and/or 307) to determine a future temperature in the space (e.g., 103, 203, and/or 303) relative to the current temperature and determine an amount of heating or cooling output needed to maintain a predetermined temperature in the space (e.g., 103, 203, and/or 303). A controller (see, e.g., controller 112 in FIG. 1, or controller 212 in FIG. 2, or controller 312 in FIG. 3) is in communication with the computer (e.g., 106, 206, and/or 306). The controller (e.g., 112, 212, and/or 312) is configured to communicate with a heating, ventilation, and air conditioning (HVAC) system (see, e.g., HVAC system 113 in FIG. 1, or HVAC system 213 in FIG. 2, or HVAC system 313 in FIG. 3). The HVAC system (e.g., 113, 213, and/or 313) is configured to control the temperature in the space (e.g., 103, 203, and/or 303) by heating or cooling the space (e.g., 103, 203, and/or 303). The controller (e.g., 112, 212, and/or 312) is configured to transmit the determined amount of heating or cooling output needed to maintain the predetermined temperature in the space (e.g., 103, 203, and/or 303) to the HVAC system (e.g., 113, 213, and/or 313) to maintain the predetermined temperature in the space (e.g., 103, 203, and/or 303).

In an aspect of the present disclosure, a temperature sensor (see, e.g., temperature sensors 114 or 154 in FIG. 1, or temperature sensors 214 or 254 in FIG. 2, or temperature sensors 314 or 354 in FIG. 3) is in communication with the computer (see, e.g., computer 106 in FIG. 1, or computer 206 in FIG. 2, or computer 306 in FIG. 3). The temperature sensor (e.g., 114, 214, and/or 314) is configured to directly measure the current temperature in the space (see, e.g., space 103 in FIG. 1, or space 203 in FIG. 2, or space 303 in FIG. 3).

In an aspect of the present disclosure, the temperature sensor (see, e.g., temperature sensor 114 in FIG. 1, or temperature sensor 214 in FIG. 2, or temperature sensor 314 in FIG. 3) is a digital temperature sensor 115, an analog temperature sensor 116, a thermocouple 117, a resistance temperature detector 118, a USB temperature sensor 119, a Wi-Fi® temperature sensor 120, or a Bluetooth® temperature sensor 121.

In an aspect of the present disclosure, an air analysis device (see, e.g., air analysis device 122 in FIG. 1, or air analysis device 222 in FIG. 2, or air analysis device 322 in FIG. 3) is in communication with the computer (see, e.g., computer 106 in FIG. 1, or computer 206 in FIG. 2, or computer 306 in FIG. 3). The air analysis device (e.g., 122, 222, and/or 322) is configured to analyze at least one of particulate matter, carbon dioxide, carbon monoxide, nitrogen dioxide, ozone, volatile organic compounds, humidity, temperature, formaldehyde, radon, air pressure, and/or smoke.

In an aspect of the present disclosure, the image analysis module (see, e.g., image analysis module 104 in FIG. 1, or image analysis module 204 in FIG. 2, or image analysis module 304 in FIG. 3) is configured to detect a person or people occupying the space (see, e.g., space 103 in FIG. 1, or space 203 in FIG. 2, or space 303 in FIG. 3) and determine an amount of thermogenesis for the person or people occupying the space (e.g., 103, 203, and/or 303). The predetermined or target temperate (e.g., programmed or set temperature) for a space may be adjusted based on a number of people in a particular space. For example, the target temperate in a space may be reduced by one degree per detected person in a particular space to account for the thermogenesis of each person in the space.

In an aspect of the present disclosure, the computer instructions are configured to instruct the processor (see, e.g., processor 107 in FIG. 1, or processor 207 in FIG. 2, or processor 307 in FIG. 3) to receive the amount of thermogenesis determined by the image analysis module (see, e.g., image analysis module 104 in FIG. 1, or image analysis module 204 in FIG. 2, or image analysis module 304 in FIG. 3), determine the future temperature in the space (see, e.g., space 103 in FIG. 1, or space 203 in FIG. 2, or space 303 in FIG. 3) relative to the current temperature based on the amount of thermogenesis determined by the image analysis module (e.g., 104, 204, and/or 304), and determine the amount of heating or cooling output needed to maintain the predetermined temperature in the space (e.g., 103, 203, and/or 303) based on the amount of thermogenesis determined by the image analysis module (e.g., 104, 204, and/or 304).

In an aspect of the present disclosure, a machine learning model (see, e.g., machine learning model 223 in FIG. 2, or machine learning model 323 in FIG. 3) is in communication with the computer (see, e.g., computer 106 in FIG. 1, or computer 206 in FIG. 2, or computer 306 in FIG. 3) and/or the image analysis module (see, e.g., image analysis module 104 in FIG. 1, or image analysis module 204 in FIG. 2, or image analysis module 304 in FIG. 3). The machine learning model (e.g., 223 and/or 323) includes an artificial neural network (see, e.g., artificial neural network 224 in FIG. 2, or artificial neural network 324 in FIG. 3) configured to analyze the images captured by the camera (see, e.g., camera 101 in FIG. 1, or camera 201 in FIG. 2, or camera 301 in FIG. 3). Each of the machine learning models (e.g., 223 and/or 323) described herein may employ some or all of the architecture of the machine learning model 1023 in FIG. 10 or machine learning model 1123 in FIG. 11, which are described in more detail below with reference to FIGS. 10 and 11, respectively.

In an aspect of the present disclosure, the machine learning model (see, e.g., machine learning model 223 in FIG. 2, or machine learning model 323 in FIG. 3) includes a convolutional neural network (CNN) (see, e.g. 1150 in FIG. 11) in communication with the artificial neural network (see, e.g., artificial neural network 224 in FIG. 2, or artificial neural network 324 in FIG. 3). The CNN (e.g. 1150) is configured to parse the images to determine the current or the future temperature in the space (see, e.g., space 103 in FIG. 1, or space 203 in FIG. 2, or space 303 in FIG. 3). The CNN (e.g., 1150) described herein may employ some or all of the architecture of the convolutional neural network 1250 in FIG. 12, which is described in more detail below with reference to FIG. 12.

In an aspect of the present disclosure, the image analysis module (see, e.g., image analysis module 104 in FIG. 1, or image analysis module 204 in FIG. 2, or image analysis module 304 in FIG. 3) is configured to detect an object or objects occupying the space (see, e.g., space 103 in FIG. 1, or space 203 in FIG. 2, or space 303 in FIG. 3), determine an amount of heat released by the object or objects occupying the space (e.g., 103, 203, and/or 303), and determine an amount of heat absorbed by the object or objects occupying the space (e.g., 103, 203, and/or 303).

In an aspect of the present disclosure, the computer instructions are configured to instruct the processor (see, e.g., processor 107 in FIG. 1, or processor 207 in FIG. 2, or processor 307 in FIG. 3) to receive the amount of heat released by the object or objects occupying the space (see, e.g., space 103 in FIG. 1, or space 203 in FIG. 2, or space 303 in FIG. 3) and the amount of heat absorbed by the object or objects occupying the space (e.g., 103, 203, and/or 303) determined by the image analysis module (see, e.g., image analysis module 104 in FIG. 1, or image analysis module 204 in FIG. 2, or image analysis module 304 in FIG. 3), determine the future temperature in the space (e.g., 103, 203, and/or 303) relative to the current temperature based on the amount of heat released by the object or objects occupying the space (e.g., 103, 203, and/or 303) and the amount of heat absorbed by the object or objects occupying the space (e.g., 103, 203, and/or 303), and determine the amount of heating or cooling output needed to maintain the predetermined temperature in the space (e.g., 103, 203, and/or 303) based on the amount of heat released by the object or objects occupying the space (e.g., 103, 203, and/or 303) and the amount of heat absorbed by the object or objects occupying the space (e.g., 103, 203, and/or 303).

In an aspect of the present disclosure, the camera (see, e.g., camera 101 in FIG. 1, or camera 201 in FIG. 2, or camera 301 in FIG. 3) includes a camera configured to capture video images, and the images are part of a video image.

In an aspect of the present disclosure, the image analysis module (see, e.g., image analysis module 104 in FIG. 1, or image analysis module 204 in FIG. 2, or image analysis module 304 in FIG. 3) is configured to determine the current temperature of the space (see, e.g., space 103 in FIG. 1, or space 203 in FIG. 2, or space 303 in FIG. 3) in real-time.

In an aspect of the present disclosure, the camera (see, e.g., camera 101 in FIG. 1, or camera 201 in FIG. 2, or camera 301 in FIG. 3) includes at least one of a thermal imaging camera 131, an infrared camera 132, a thermographic camera 133, a laser thermometer camera 134, a radiometric camera 135, or a thermal sensor camera 136.

In an aspect of the present disclosure, the device (see, e.g., HVAC control device 100 in FIG. 1, or HVAC control device 200 in FIG. 2, or HVAC control device 300 in FIG. 3) includes a wireless transmitter (see, e.g. wireless transmitter 137 in FIG. 1, or wireless transmitter 237 in FIG. 2, or wireless transmitter 337 in FIG. 3) configured to connect the controller (see, e.g., controller 112 in FIG. 1, or controller 212 in FIG. 2, or controller 312 in FIG. 3) with the HVAC system (see, e.g., HVAC system 113 in FIG. 1, or HVAC system 213 in FIG. 2, or HVAC system 313 in FIG. 3).

In an aspect of the present disclosure, the controller (see, e.g., controller 112 in FIG. 1, or controller 212 in FIG. 2, or controller 312 in FIG. 3) is configured to communicate with the HVAC system (see, e.g., HVAC system 113 in FIG. 1, or HVAC system 213 in FIG. 2, or HVAC system 313 in FIG. 3) by a Wi-Fi®, Bluetooth®, or cellular network connection.

In an aspect of the present disclosure, the HVAC system (see, e.g., HVAC system 113 in FIG. 1, or HVAC system 213 in FIG. 2, or HVAC system 313 in FIG. 3) includes a wireless transmitter (see, e.g. wireless transmitter 138 in FIG. 1, or wireless transmitter 238 in FIG. 2, or wireless transmitter 338 in FIG. 3) configured to communicate with the controller (see, e.g., controller 112 in FIG. 1, or controller 212 in FIG. 2, or controller 312 in FIG. 3).

In an aspect of the present disclosure, a wireless transmitter (see, e.g. wireless transmitter 139 in FIG. 1, or wireless transmitter 239 in FIG. 2, or wireless transmitter 339 in FIG. 3) is configured to communicate with a cloud-based server (see, e.g., cloud-based server 140 in FIG. 1, or cloud-based server 240 in FIG. 2, or cloud-based server 340 in FIG. 3).

In an aspect of the present disclosure, the wireless transmitter (see, e.g. wireless transmitter 139 in FIG. 1, or wireless transmitter 239 in FIG. 2, or wireless transmitter 339 in FIG. 3) is configured to communicate with the cloud-based server (see, e.g., cloud-based server 140 in FIG. 1, or cloud-based server 240 in FIG. 2, or cloud-based server 340 in FIG. 3) through an internet or cellular network connection.

Referring to FIGS. 4 to 6, a system (see, e.g. HVAC control system 400 in FIG. 4, or HVAC control system 500 in FIG. 5, or HVAC control system 600 in FIG. 6) for controlling heating, ventilation, and air conditioning (HVAC) systems includes a camera (camera 401 in FIG. 4, or camera 501 in FIG. 5, or camera 601 in FIG. 6) configured to capture a number of images of a space (see, e.g., space 403 in FIG. 4, or space 503 in FIG. 5, or space 603 in FIG. 6). The images captured by the camera (e.g., 401, 501, and/or 601) include temperature data for the space (e.g., 403, 503, and/or 603). A control system (see, e.g., HVAC control system 450 in FIG. 4, HVAC control system 550 in FIG. 5, HVAC control system 650 in FIG. 6) is in communication with the camera (e.g., 401, 501, and/or 601). The control system (e.g., 450, 550, and/or 650) includes an image analysis module (see, e.g., image analysis module 404 in FIG. 4, or image analysis module 504 in FIG. 5, or image analysis module 604 in FIG. 6). The image analysis module (e.g., 404, 504, and/or 604) is configured to receive the images and analyze the images to determine a current temperature in the space (e.g., 403, 503, and/or 603). The control system (e.g., 450, 550, and/or 650) includes a computer (see, e.g., computer 406 in FIG. 4, or computer 506 in FIG. 5, or computer 606 in FIG. 6) in communication with the image analysis module (e.g., 404, 504, and/or 604). The computer (e.g. 406, 506, and/or 606) includes at least one processor (see, e.g., processor 407 in FIG. 4, or processor 507 in FIG. 5, or processor 607 in FIG. 6) and at least one memory (see, e.g., memory 408 in FIG. 4, or memory 508 in FIG. 5, or memory 608 in FIG. 6) in communication with the processor(s) (e.g. 407, 507, and/or 607). The memory (e.g. 408, 508, and/or 608) stores computer instructions configured to instruct the processor (e.g. 407, 507, and/or 607) to determine a future temperature in the space (e.g. 403, 503, and/or 603) relative to the current temperature and determine an amount of heating or cooling output needed to maintain a predetermined temperature in the space (e.g. 403, 503, and/or 603). The control system (e.g., 450, 550, and/or 650) includes a controller (see, e.g., controller 412 in FIG. 4, or controller 512 in FIG. 5, or controller 612 in FIG. 6) in communication with the computer (e.g., 406, 506, and/or 606). The system includes a heating, ventilation, and air conditioning (HVAC) system (see, e.g., HVAC system 313 in FIG. 3, or HVAC system 413 in FIG. 4, or HVAC system 513 in FIG. 5, or HVAC system 613 in FIG. 6) in communication with the controller (e.g. 412, 512, and/or 612). The HVAC system (e.g., 313, 413, and/or 513) is configured to control the temperature in the space (e.g., 403, 503, and/or 603) by heating or cooling the space (e.g., 403, 503, and/or 603). The controller (e.g. 412, 512, and/or 612) is configured to transmit the determined amount of heating or cooling output needed to maintain the predetermined temperature in the space (e.g. 403, 503, and/or 603) to the HVAC system (e.g. 313, 413, and/or 513) to maintain the predetermined temperature in the space (e.g. 403, 503, and/or 603).

In an aspect of the present disclosure, the system includes a temperature sensor (see, e.g., temperature sensor 414 in FIG. 4, or temperature sensor 514 in FIG. 5, or temperature sensor 614 in FIG. 6) in communication with the computer (see, e.g., computer 406 in FIG. 4, or computer 506 in FIG. 5, or computer 606 in FIG. 6). The temperature sensor (e.g. 414, 514, and/or 614) is configured to directly measure the current temperature in the space (see, e.g., space 403 in FIG. 4, or space 503 in FIG. 5, or space 603 in FIG. 6).

In an aspect of the present disclosure, the temperature sensor (see, e.g., temperature sensor 414 in FIG. 4, or temperature sensor 514 in FIG. 5, or temperature sensor 614 in FIG. 6) is a digital temperature sensor 415, an analog temperature sensor 416, a thermocouple 417, a resistance temperature detector 418, a USB temperature sensor 419, a Wi-Fi® temperature sensor 420, or a Bluetooth® temperature sensor 420.

In an aspect of the present disclosure, the system includes an air analysis device (see, e.g., air analysis device 422 in FIG. 4, or air analysis device 522 in FIG. 5, or air analysis device 622 in FIG. 6) in communication with the computer (computer 406 in FIG. 4, or computer 506 in FIG. 5, or computer 606 in FIG. 6). The air analysis device (e.g., 422, 522, and/or 622) is configured to analyze at least one of particulate matter, carbon dioxide, carbon monoxide, nitrogen dioxide, ozone, volatile organic compounds, humidity, temperature, formaldehyde, radon, air pressure, or smoke.

In an aspect of the present disclosure, the image analysis module (see, e.g., image analysis module 404 in FIG. 4, or image analysis module 504 in FIG. 5, or image analysis module 604 in FIG. 6) is configured to detect a person or people occupying the space (see, e.g., space 403 in FIG. 4, or space 503 in FIG. 5, or space 603 in FIG. 6) and determine an amount of thermogenesis for the person or people occupying the space (e.g. 403, 503, and/or 603).

An artificial neural network (see, e.g., artificial neural networks 1023 and/or 1123 described herein) may be employed to create a 3-dimensional representation of a room or space and detect thermal-generating items, such as people or devices in the space. This enables precise HVAC control by tailoring temperature, airflow, and other parameters to occupancy patterns and localized heat sources.

Creating the 3-dimensional (3-D) representation or model of the room my include capturing data using scanners/sensors (e.g., the cameras/temperature sensors described herein) to capture thermal signatures of the environment, identifying heat sources based on temperature differentials. Devices such as LiDAR or stereo cameras can be employed to collect depth data to map the spatial dimensions of the room or space. As an example, RGB cameras can be used or additional context and segmentation, combining visual and thermal data for better object classification. In creating the 3-D model of the room, the artificial neural network may employ image fusion (combining thermal data with depth and/or RGB data to create composite input representations), normalization (temperature and spatial data are scaled to consistent units for input into the neural network), and noise reduction (Filters (e.g., Gaussian blur) smooth raw data to remove sensor noise while preserving critical features).

The neural network model may include:

1. An Input Layer accepting multi-channel input tensors combining thermal, depth, and RGB data. Each channel encodes specific features (e.g., temperature gradients, spatial coordinates).

2. Feature Extraction including convolutional layers (extract thermal patterns and spatial features to distinguish between people, devices, and static objects), and attention mechanisms focusing on dynamic and high-temperature regions, emphasizing areas with thermal activity.

3. 3D Reconstruction including voxel representation (converting spatial and thermal data into a voxel grid representing the room in three dimensions), and 3D Convolutional Networks (3D-CNN) to analyze the voxel grid to refine object segmentation and spatial localization.

4. An Output Layer including a 3D room model annotated with detected thermal-generating items, their locations, and heat emission levels.

Thermal source detection may include object classification identifying people, devices, or other heat sources used pre-trained classifiers, and thermal profiling including measuring temperature intensity and distribution across detected objects to categorize sources (e.g., individual people or groups of people) based on their thermal impact to a space.

Thermal generating and/or absorbing items in a space may include, for example, people, walls, windows, doors, desks, chairs, computers, devices, monitors, hardware, walls, rugs, materials used to form walls, floor, or ceilings, electrical cables, plants, pictures, appliances, and the like. The materials included in each of the preceding items may similarly be detected and incorporated by an artificial neural network to evaluate the thermodynamic properties of a particular space.

Integration of the 3-D model of the space described above may include:

1. Real-Time Analysis in which the artificial neural network operates in real time, continuously updating the 3D room model and tracking heat sources as they move or change.

2. Zone-Based HVAC Adjustment, such as localized control of HVAC parameters (e.g., airflow, cooling/heating intensity, mode, fan speed, etc.) that are adjusted for specific areas based on occupancy and thermal load. For example, cooling can be intensified near a cluster of occupants while reducing output in unoccupied areas of a room, space, or particular areas of a building.

3. Thermal Balance in which the system calculates the cumulative thermal load of the room or space, integrating input from the artificial neural network and environmental sensors (e.g., ambient temperature, humidity). Corresponding, the HVAC systems are instructed to adjust output to maintain a uniform temperature, avoiding hot or cold spots.

4. Energy Optimization in which, by focusing on occupied zones and active thermal sources, the system reduces energy consumption, operating HVAC components only where necessary.

In an aspect of the present disclosure, the computer instructions of the system are configured to instruct the processor (see, e.g., processor 407 in FIG. 4, or processor 507 in FIG. 5, or processor 607 in FIG. 6) to receive the amount of thermogenesis determined by the image analysis module (see, image analysis module 404 in FIG. 4, or image analysis module 504 in FIG. 5, or image analysis module 604 in FIG. 6), determine the future temperature in the space (see, e.g., space 403 in FIG. 4, or space 503 in FIG. 5, or space 603 in FIG. 6) relative to the current temperature based on the amount of thermogenesis determined by the image analysis module (e.g. 404, 504, and/or 604), and determine the amount of heating or cooling output needed to maintain the predetermined temperature in the space (e.g. 403, 503, and/or 603) based on the amount of thermogenesis determined by the image analysis module (e.g. 404, 504, and/or 604).

In an aspect of the present disclosure, the system includes a machine learning model (see, e.g. machine learning model 523 in FIG. 5, or machine learning model 623 in FIG. 6) in communication with the computer (see, e.g. computer 406 in FIG. 4, or computer 506 in FIG. 5, or computer 606 in FIG. 6) and/or the image analysis module (see, e.g., image analysis module 404 in FIG. 4, or image analysis module 504 in FIG. 5, or image analysis module 604 in FIG. 6). The machine learning model (e.g., 523 and/or 623) includes an artificial neural network (see, e.g., artificial neural network 524 in FIG. 5, or artificial neural network 624 in FIG. 6) configured to analyze the images. Each of the machine learning models (e.g., 523 and/or 623) described herein may employ some or all of the architecture of the machine learning model 1023 in FIG. 10 or machine learning model 1123 in FIG. 11, which are described in more detail below with reference to FIGS. 10 and 11, respectively.

In an aspect of the present disclosure, the machine learning model (see, e.g. machine learning model 523 in FIG. 5, or machine learning model 623 in FIG. 6) includes a convolutional neural network (CNN) (see, e.g. 1150 in FIG. 11) in communication with the artificial neural network (see, e.g. artificial neural network 524 in FIG. 5, or artificial neural network 624 in FIG. 6). The CNN (e.g. 1150) is configured to parse the images to determine the current or the future temperature in the space (see, e.g., space 403 in FIG. 4, or space 503 in FIG. 5, or space 603 in FIG. 6). The CNN (e.g., 1150) described herein may employ some or all of the architecture of the convolutional neural network 1250 in FIG. 12, which is described in more detail below with reference to FIG. 12.

In an aspect of the present disclosure, the image analysis module (see, e.g., image analysis module 404 in FIG. 4, or image analysis module 504 in FIG. 5, or image analysis module 604 in FIG. 6) of the system is configured to detect an object or objects occupying the space (see, e.g., space 403 in FIG. 4, or space 503 in FIG. 5, or space 603 in FIG. 6), determine an amount of heat released by the object or objects occupying the space (e.g. 403, 503, and/or 603), and determine an amount of heat absorbed by the object or objects occupying the space (e.g. 403, 503, and/or 603).

In an aspect of the present disclosure, the computer instructions of the system are configured to instruct the processor (see, e.g., processor 407 in FIG. 4, or processor 507 in FIG. 5, or processor 607 in FIG. 6) to receive the amount of heat released by the object or objects occupying the space (see, e.g., space 403 in FIG. 4, or space 503 in FIG. 5, or space 603 in FIG. 6) and the amount of heat absorbed by the object or objects occupying the space (e.g. 403, 503, and/or 603) determined by the image analysis module (see, e.g., image analysis module 404 in FIG. 4, or image analysis module 504 in FIG. 5, or image analysis module 604 in FIG. 6), determine the future temperature in the space (e.g. 403, 503, and/or 603) relative to the current temperature based on the amount of heat released by the object or objects occupying the space (e.g. 403, 503, and/or 603) and the amount of heat absorbed by the object or objects occupying the space (e.g. 403, 503, and/or 603), and determine the amount of heating or cooling output needed to maintain the predetermined temperature in the space (e.g. 403, 503, and/or 603) based on the amount of heat released by the object or objects occupying the space (e.g. 403, 503, and/or 603) and the amount of heat absorbed by the object or objects occupying the space (e.g. 403, 503, and/or 603).

In the present disclosure, the camera (camera 401 in FIG. 4, or camera 501 in FIG. 5, or camera 601 in FIG. 6) is configured to capture video images. The images captured by the camera are part of a video image.

In an aspect of the present disclosure, the image analysis module (see, e.g., image analysis module 404 in FIG. 4, or image analysis module 504 in FIG. 5, or image analysis module 604 in FIG. 6) is configured to determine the current temperature of the space (see, e.g., space 403 in FIG. 4, or space 503 in FIG. 5, or space 603 in FIG. 6) in real-time.

In an aspect of the present disclosure, the camera (camera 401 in FIG. 4, or camera 501 in FIG. 5, or camera 601 in FIG. 6) includes at least one of a thermal imaging camera, an infrared camera, a thermographic camera, a laser thermometer camera, a radiometric camera, or a thermal sensor camera.

In an aspect of the present disclosure, the system includes a wireless transmitter (see, e.g. wireless transmitter 437 in FIG. 4, or wireless transmitter 537 in FIG. 5, or wireless transmitter 637 in FIG. 6) configured to connect the controller (see, e.g. controller 412 in FIG. 4, or controller 512 in FIG. 5, or controller 612 in FIG. 6) with the HVAC system (see, e.g., HVAC system 313 in FIG. 3, or HVAC system 413 in FIG. 4, or HVAC system 513 in FIG. 5, or HVAC system 613 in FIG. 6).

In an aspect of the present disclosure, the controller (see, e.g. controller 412 in FIG. 4, or controller 512 in FIG. 5, or controller 612 in FIG. 6) of the system is configured to communicate with the HVAC system (see, e.g., HVAC system 313 in FIG. 3, or HVAC system 413 in FIG. 4, or HVAC system 513 in FIG. 5, or HVAC system 613 in FIG. 6) by a Wi-Fi®, Bluetooth®, or cellular network connection.

In an aspect of the present disclosure, the HVAC system (see, e.g., HVAC system 313 in FIG. 3, or HVAC system 413 in FIG. 4, or HVAC system 513 in FIG. 5, or HVAC system 613 in FIG. 6) includes a wireless transmitter (see, e.g., wireless transmitter 438 in FIG. 4, or wireless transmitter 538 in FIG. 5, or wireless transmitter 638 in FIG. 6) configured to communicate with the controller (see, e.g. controller 412 in FIG. 4, or controller 512 in FIG. 5, or controller 612 in FIG. 6).

In an aspect of the present disclosure, the system includes a wireless transmitter (see, e.g., wireless transmitter 439 in FIG. 4, or wireless transmitter 539 in FIG. 5, or wireless transmitter 639 in FIG. 6) configured to communicate with a cloud-based server (see, e.g., cloud-based server 440 in FIG. 4, or cloud-based server 540 in FIG. 5, or cloud-based server 640 in FIG. 6).

In an aspect of the present disclosure, the wireless transmitter (see, e.g., wireless transmitter 439 in FIG. 4, or wireless transmitter 539 in FIG. 5, or wireless transmitter 639 in FIG. 6) of the system is configured to communicate with the cloud-based server (see, e.g., cloud-based server 440 in FIG. 4, or cloud-based server 540 in FIG. 5, or cloud-based server 640 in FIG. 6) through an internet or cellular network connection.

Figure 7:
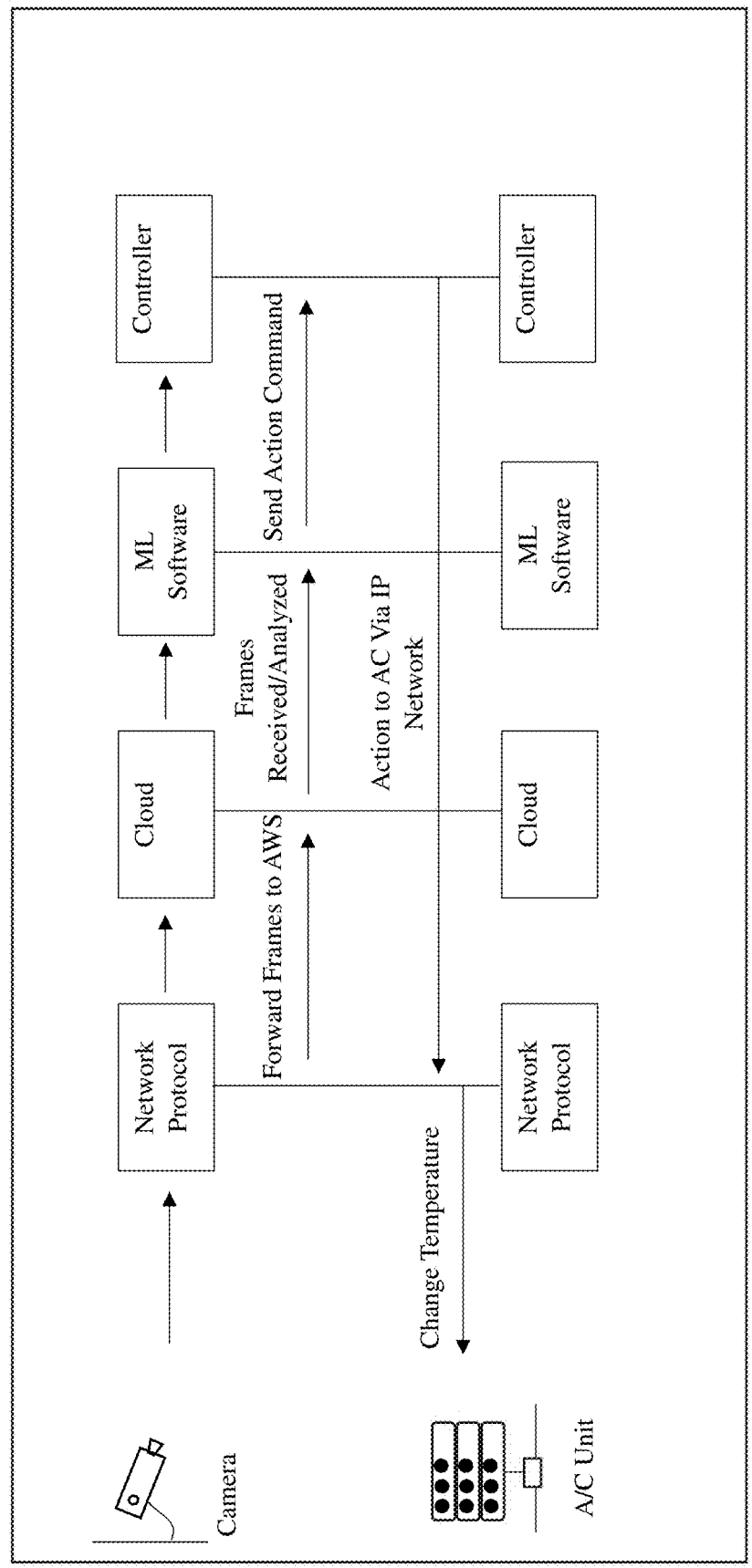
FIG. 7 is a schematic diagram of another system for controlling an HVAC system according to aspects of the present disclosure.

FIG. 7 is a schematic diagram of another system 700 for controlling an HVAC system according to aspects of the present disclosure.

Figure 8A:
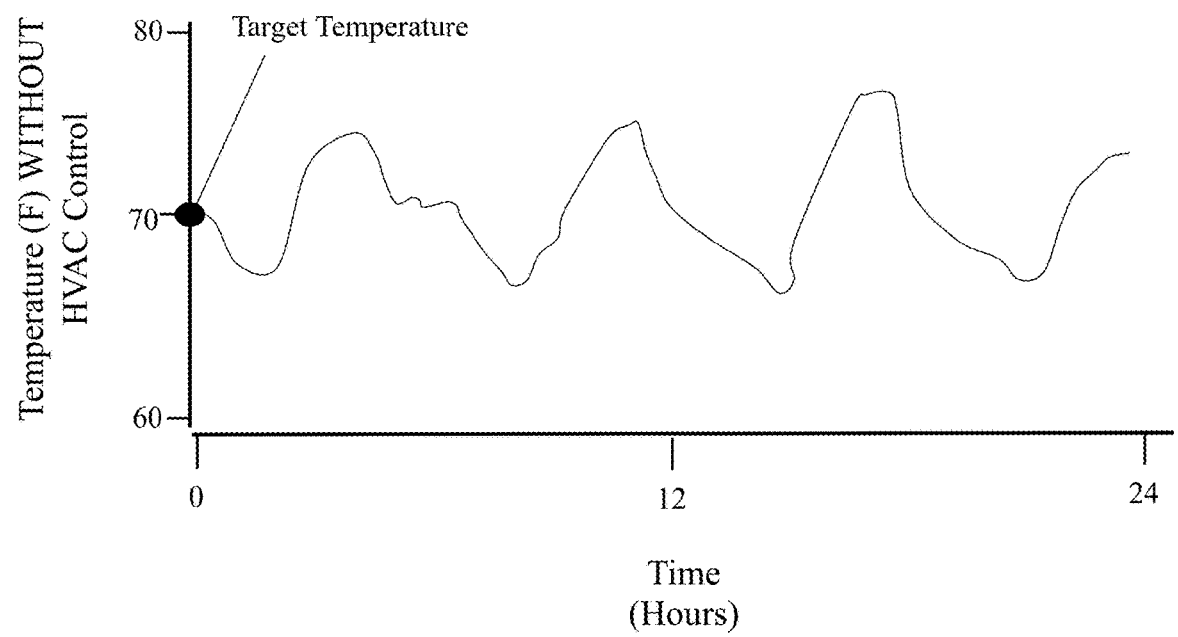
FIGS. 8A and 8B illustrate exemplary data comparing temperature fluctuations in a space with and without HCAC control according to aspects of the present disclosure.
Figure 8B:
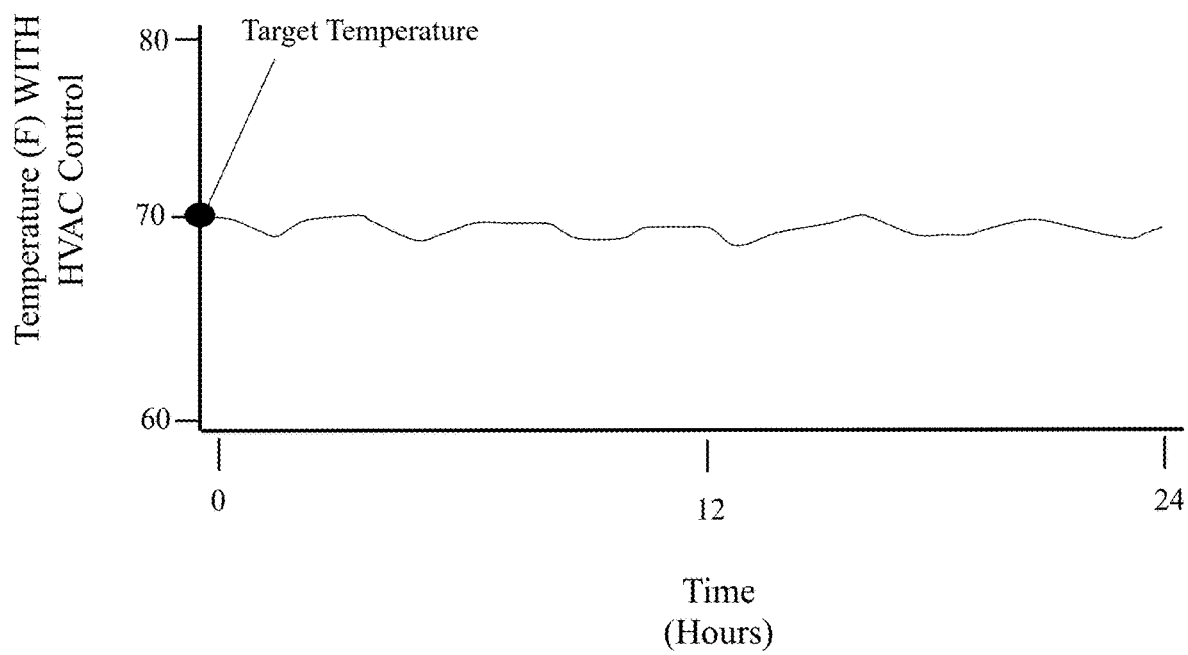

FIGS. 8A and 8B illustrate graphs 801 and 802, respectively, showing exemplary data comparing temperature fluctuations in a space with and without HCAC control according to aspects of the present disclosure. FIGS. 8A and 8B illustrate a reduced variation in temperature with respect to a target temperature when HVAC control is employed according to the devices, system, and methods described herein.

Figure 9:
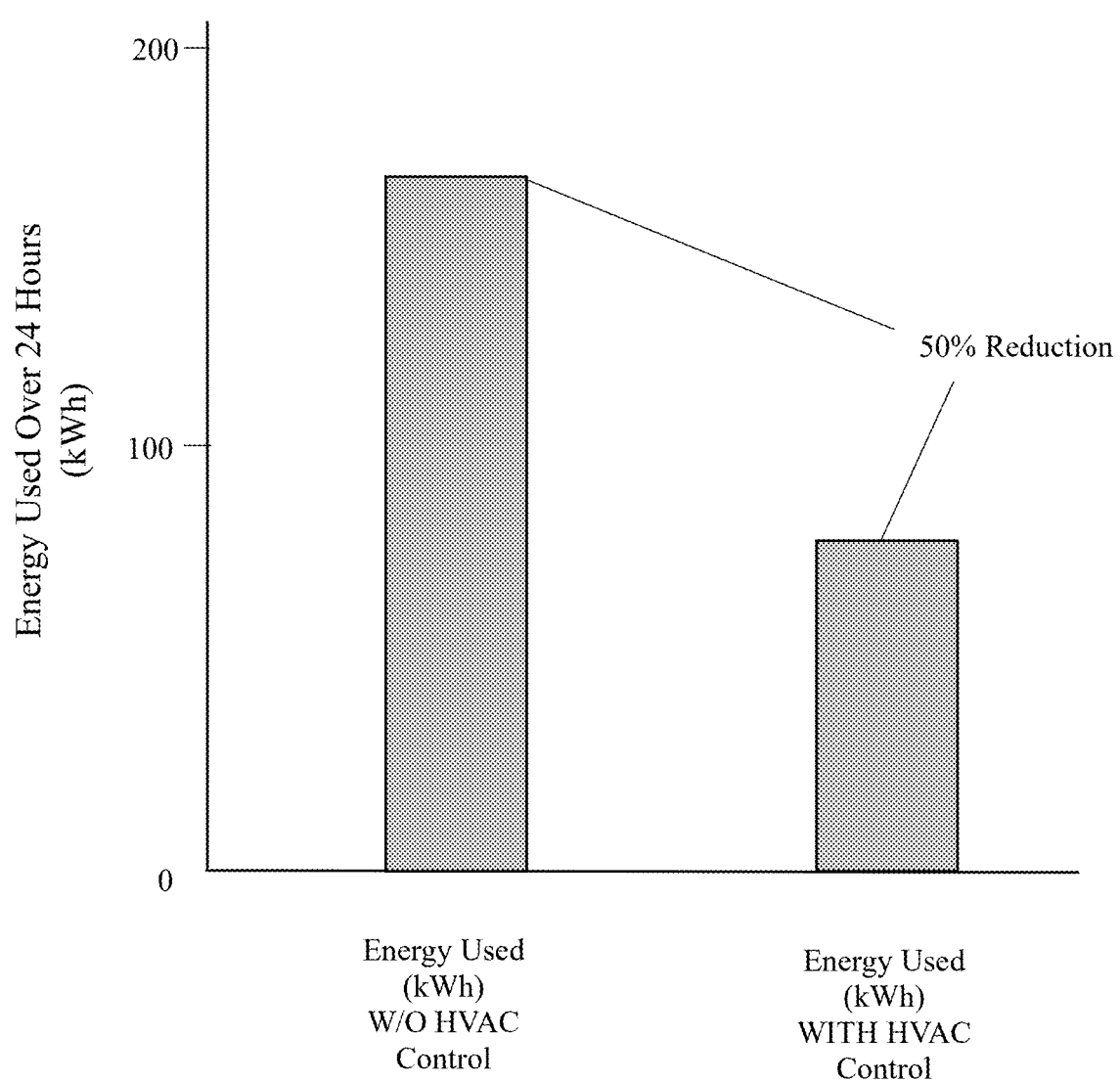
FIG. 9 illustrates exemplary data comparing energy usage with and without HCAC control according to aspects of the present disclosure.

FIG. 9 illustrates a graph 900 of exemplary data comparing energy usage with and without HCAC control according to aspects of the present disclosure.

With particular reference to FIG. 9, the devices, systems, and methods described herein may achieve, for example, a 50% reduction in energy consumption for maintaining a desired temperature in a space, such as a commercial building.

Figure 10:
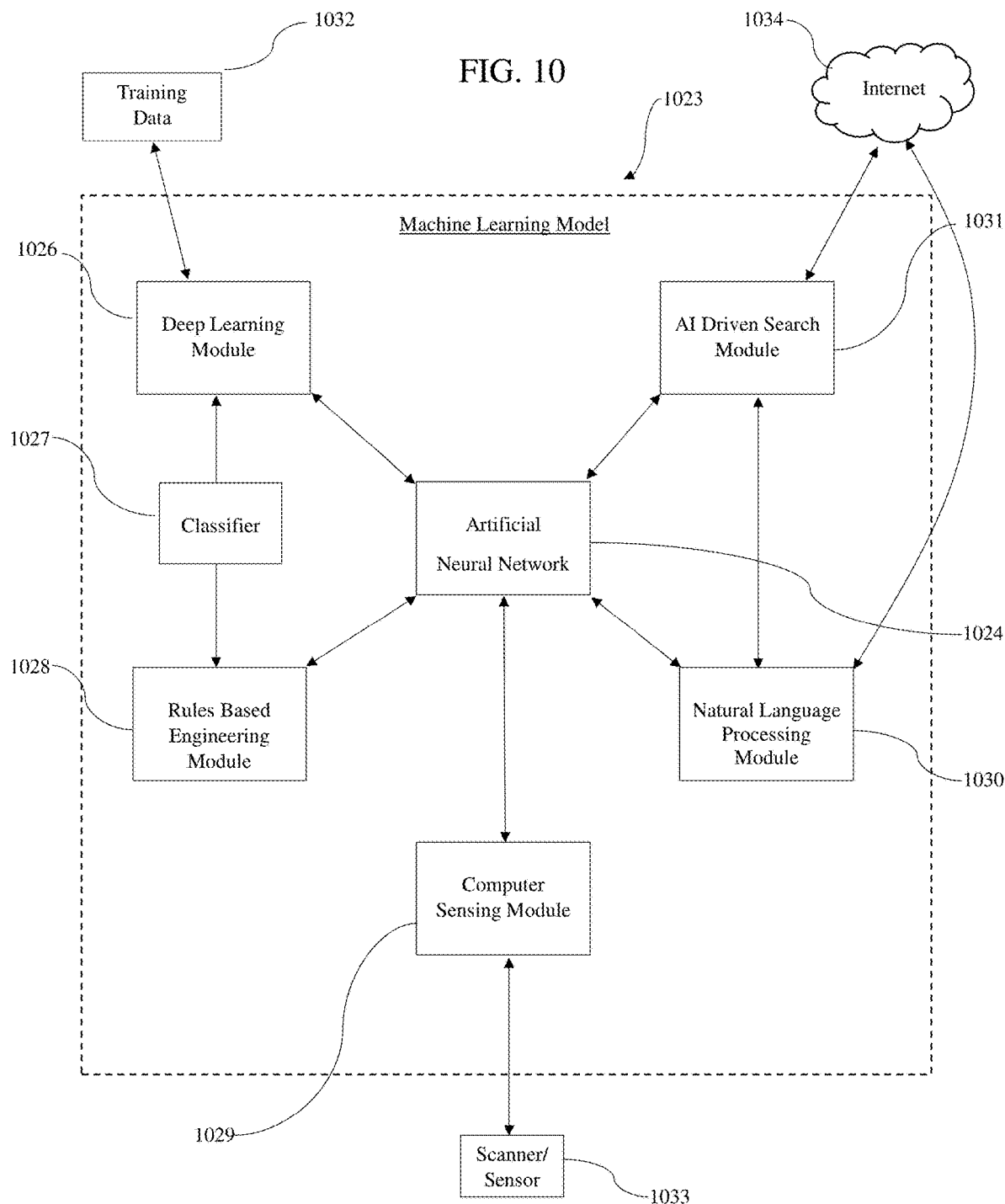
FIG. 10 is a schematic illustration of a machine learning model architecture including an artificial neural network employable by the devices and systems described herein.

FIG. 10 is a schematic illustration of a machine learning model 1023 architecture including an artificial neural network 1024 employable by the devices and systems described herein.

Referring particularly to FIG. 10, an exemplary architecture of a machine learning model 1023 including an artificial neural network 1024 employable by the devices, systems, and methods herein is described. The machine learning model 1023 may be initially trained on a first data set, such as a first training data set stored in training data database 1032. The machine learning model 1023 may then be iteratively trained on additional training data sets (e.g., a second data set, a third data set, etc.) that are continuously added to the training data database 1032 as additional training data becomes available. Thus, the machine learning model 1023 can be iteratively trained and the resulting functionality and predication accuracy of the machine learning model 1023 itself may be iteratively improved.

For example, the machine learning model 1023 may be initially trained on a first data set to predict a thermal output (e.g., heat or cold) needed to maintain a predetermined temperature in a space, while also considering the thermodynamic characteristics of items (e.g., people and/or objects) in a particular space. The machine learning model 1023 may be initially trained on the first data set to detect a number of individual people in a space (e.g., as part of the thermodynamic characteristics of the space) to specifically predict the thermal output needed to maintain the predetermined temperature in the space. Subsequently, the machine learning model 1023 may be iteratively trained on additional training data sets as they become available through interactions between the machine learning model 1023 and the particular space. This has the practical application of improving the accuracy and functionality of the predictive outputs of the machine learning model 1023 itself, while also having the practical application of improving the technology of HVAC control. The inventor has found that this provides the further improvement in the technology of HVAC control and temperature regulation by reducing an amount of energy used by an HVAC system by efficiently managing thermal output based on the ever changing thermodynamic characteristics of a particular space, such as different numbers of heat generating people occupying the space at various times.

Training the artificial neural network (ANN) to control an HVAC system may involve an iterative process where the ANN learns to adjust system parameters to efficiently control the temperature in a given space through various cycles of heat and/or cold output and also periodically turning the system off or putting the system into standby mode to maximally conserve energy while also maintaining the desired temperature in a space with a minimum of temperature fluctuations, thus maximizing comfort for users. Training the artificial neural network may include:

1. Data collection in which input data includes collecting diverse data sets that reflect various environmental conditions and system states. Inputs may include one or more of indoor temperature, outdoor temperature, humidity levels, occupancy levels (current or anticipated), time of day, energy prices, and/or historical HVAC performance data. Evaluation of collected data drives output data from the system, such as desired HVAC system states, such as fan speed, compressor settings, or valve positions.

2. Identifying network architecture. An exemplary ANN architecture may include input layers to accept the collected environmental and system data, hidden layers to capture complex relationships between inputs and outputs, and an output layer to generate control signals for the HVAC system. The initial ANN architecture may employ randomly initialized weights and biases.

3. Training data preparation includes splitting training data into a training data set used to teach the ANN, a validation data set used to evaluate performance of the ANN outputs, and a testing data set for an additional evaluation of the performance of the ANN outputs.

4. Defining the training process includes defining a metric that quantifies the error between the predicted control actions and the optimal ones (e.g., Mean Squared Error, Energy Consumption). An optimization algorithm may be employed in the training process, such as Gradient Descent, Adam, or RMSProp to adjust weights iteratively. A learning rate is set control how much weights are updated per iteration.

5. Iterative training includes a forward pass such that for each data point in the training set, pass the inputs through the ANN to generate a predicted output. A loss calculation is performed to compare the predicted output with the actual target and calculate the loss. A backward pass includes computing gradients of the loss with respect to the ANN's weights using backpropagation. A weight update step is formed to adjust the weights based on the gradients and the learning rate. The training process is iteratively repeated over multiple epochs until the loss converges or the model reaches satisfactory performance (e.g., based on a predetermined reduction in energy usage by an HVAC system).

6. A reinforcement learning step may be incorporated in which the ANN acts as the policy to control the HVAC, the environment provides a reward signal based on performance (e.g., energy efficiency, occupant comfort), and the network is updated iteratively to maximize cumulative rewards.

7. Validation and fine-tuning includes evaluating the ANN on the validation set to ensure it generalizes well to unseen data, and adjusting hyperparameters like learning rate, number of neurons, or architecture if necessary.

8. Real-world testing includes deploying the trained ANN in a simulated environment or a real HVAC system, monitoring performance metrics such as energy usage, temperature stability, and occupant comfort, and using feedback to refine the training process.

9. Continuous learning is carried out, including collecting new data from the operational HVAC system (e.g., energy usage), and periodically retraining or fine-tuning the ANN to adapt to changing conditions (e.g., seasonal variations, system wear and tear).

This iterative training process improves the performance of the ANN model itself, while also improving the particular technology of HVAC control for temperature regulation and improving the particular technology of minimizes energy usage of HVAC systems while simultaneously maintaining user comfort.

As an example, the machine learning model 1023 may include the artificial neural network 1024 including or configured to communicate with a deep learning module 1026, a classifier 1027, a rules-based engineering module 1028, a computer sensing module 1029, a natural language processing module 1030, and/or an artificial intelligence (AI) drive search module 1031. The Deep learning module 1026 may access training data, such as training data stored in a training data database 1032. The training data database 1032 can be continuously updated with new/expanded training data. Training an AI module, such as a deep learning module 1026, is described in more detail below. The classifier 1027 may be employed by at least one of the deep learning module 1026 or the rules-based engineering module 1028. The computer sensing module 1029 may be employed communicating with the cameras described herein to receive the images or video feeds. The computer sensing module 1029 may employ or interface with any of the scanner/sensors 1033 described herein (see, e.g., the cameras illustrated and described with reference to (see, e.g., camera 101 in FIG. 1, or camera 201 in FIG. 2, or camera 301 in FIG. 3, or camera 401 in FIG. 4, or camera 501 in FIG. 5, or camera 601 in FIG. 6). The AI drive search module 1031 and/or the natural language processing module 1030 may communicate with the internet 1034 to receive data employable in predicting future temperatures in a space (see, e.g., space 103 in FIG. 1, or space 203 in FIG. 2, or space 303 in FIG. 3, or space 403 in FIG. 4, or space 503 in FIG. 5, or space 603 in FIG. 6). Updated information may be captured from the internet 1034 on a constant and instantaneous or near-instantaneous basis.

The artificial neural network 1024 may refer to the architectural core of the machine learning model 1023. The neural network 1024 may take a set of inputs, pass the inputs through a series of hidden layers, in which each layer can transform the inputs, and then produce an output. The process of transforming the input is determined by the weights and biases of the neurons in the hidden layers of the neural network 1024, which are learned from data during training of the neural network 1024 (see, e.g., training data database 1032). The neural network 1024 may include relatively simple (single layer) or relatively complex structures (multiple layers). The deep learning module 1026 may employ a particular type of neural network 1024 (see e.g., a Convolutional Neural Network 1150 in FIG. 11) to process image data, while the classifier 1027 may use another type of neural network (e.g., a Feed-Forward Neural Network) to make predictions based on the processed data.

The deep learning module 1026 may be employed by the neural network 1024. The deep learning module 1026 may deliver high-dimensional representations of user data to the neural network 1024. The neural network 1024 may then use the information from the deep learning module 1026 to learn complex patterns and inform the neural network's 1024 decision-making processes. Similarly, the classifier 1027 may be employed by the neural network 1024. The classifier 1027 may use the neural network's 1024 output to categorize or classify inputs into different classes. Additionally, the neural network 1024 may help guide the AI-driven search module 1031 by helping to understand HVAC related data relative to a space of interest. The AI-driven search module 1031 may use the learned representations from the neural network 1024 to better tailor search results. The neural network 1024 may work with the natural language processing module 1030 by generating language representations that the natural language processing module 1030 may use for understanding and generating text. The neural network 1024 may employ the sensory data from the computer sensing module 1029 to help inform the neural network's 1024 understanding of the user's context. For example, location data from the computer sensing module 1029 may be employed to adjust HVAC output calculations.

The computer sensing module 1029 may process sensory data received at the machine learning model 1023. For example, the computer sensing module 1029 may process location data from a camera ((see, e.g., camera 101 in FIG. 1, or camera 201 in FIG. 2, or camera 301 in FIG. 3, or camera 401 in FIG. 4, or camera 501 in FIG. 5, or camera 601 in FIG. 6) or air analysis device (see, e.g., air analysis device 122 in FIG. 1, or air analysis device 222 in FIG. 2, or air analysis device 322 in FIG. 3, or air analysis device 422 in FIG. 4, or air analysis device 522 in FIG. 5, or air analysis device 622 in FIG. 6). Additionally, the computer sensing module 1029 may collect information about the space. To collect data, the computer sensing module 1029 can interface with various hardware devices (see e.g., scanners/sensors 1033 in FIG. 10), such as for example, cameras (see, e.g. camera 101 in FIG. 1, or camera 201 in FIG. 2, or camera 301 in FIG. 3, or camera 401 in FIG. 4, or camera 501 in FIG. 5, or camera 601 in FIG. 6), microphones, location sensors for tracking location within a space (see, e.g. space 103 in FIG. 1, or space 203 in FIG. 2, or space 303 in FIG. 3, or space 403 in FIG. 4, or space 503 in FIG. 5, or space 603 in FIG. 6), or an app (e.g., a smartphone application or an application running on a local computer) for collecting direct user feedback (e.g., direct user feedback may include ratings or comments).

Sensory inputs from the computer sensing module 1029 may be employed to deliver real-time HVAC control instructions. The computer sensing module 1029 may transmit sensory data to the deep learning module 1026. The sensory data can be processed by the deep learning module 1026 to provide insight into the user's behavior or preferences.

The deep learning module 1026 can be employed for generating embeddings and high-dimensional representations of the user data. The outputs from the deep learning module 1026 can be employed by the other modules within the machine learning model 1023 to make predictions about environmental changes that are likely to occur in a space over time. Over the course of predictions and feedback, the deep learning module 1026 can become more accurate in regulating HVAC use.

The output from the deep learning module 1026 can serve as the primary output for the classifier 1027. The classifier 1027 can receive the outputs from the deep learning module 1026 and use those outputs to make decisions about HVAC control. Feedback from the classifier 1027 can then be used to adjust and refine the outputs from the deep learning module 1026. The deep learning module 1026 output can act on the rules-based engineering module 1028 to inform and update the rule-based engineering module's 1028 rule implementation. Outputs from the deep learning module 1026 can be used by the AI-driven search module 1031 to refine the AI-driven search module's 1031 activity.

The classifier 1027 can receive inputs and assign a class label to those inputs. The classifier 1027 can take the embedded generated outputs from the deep learning module 1026 and make a prediction about the most efficient HVAC control.

The classifier 1027 can work in tandem with the rules-based engineering module 1028. After the classifier 1027 makes predictions, but before the predicted content is relayed, the predictions may be filtered or adjusted by the rules-based engineering module 1028 to ensure the classifier's 1027 predictions comply with certain constraints or business rules.

The rules-based engineering module 1028, by utilizing predefined logic and constraints (rules), can be employed to influence the machine learning model's 1023 output of HVAC control protocols.

The rules-based engineering module 1028 may use the output from the deep learning module 1026 to determine which rules apply for a particular space (see, e.g. space 103 in FIG. 1, or space 203 in FIG. 2, or space 303 in FIG. 3, or space 403 in FIG. 4, or space 503 in FIG. 5, or space 603 in FIG. 6). Additionally, the rules-based engineering module 1028 may adjust recommendations from the classifier 1027. The rules-based engineering module 1028 may take location data from the computer sensing module 1029 and invoke rules applicable to that particular location, such as the particular location or locations of the HVAC system within a particular space. The rules-based engineering module 1028 may interact with the AI-driven search module 1031 to help guide the AI-driven search module 1031. Thus, the rules-based engineering module 1028 may invoke rules that directly operate on the natural language processing module 1030.

The AI-driven search module 1031 may be used to search for data on the internet 1034. The AI-driven search module 1031 may also use reinforcement learning to continually improve the module's recommendations. For example, the AI-driven search module 1031 may, over time, and through interaction with other modules of the machine learning model 1023, learn ideal HVAC operating protocols. The AI-driven search module 1031 may also use real-time user feedback to adjust HVAC protocol recommendations.

The natural language processing module 1030 may be employed by the machine learning model 1023 to understand, interpret, generate, and interact with spoken or written human language. This may include understanding user queries or understanding text-based content. The natural language processing module 1030 may be used to understand user feedback or enable text-based user interactions. Additionally, the natural language processing module 1030 may be used to generate human-like text responses that can be used to communicate with the user. Moreover, the natural language processing module 1030 may enable real-time dialogue between the user and the machine learning model 1023, allowing the user to ask questions, provide feedback, or change their preferences in a natural, conversational way.

The natural learning processing module may use the deep learning module 1026 to process and understand human language inputs. The output from the deep learning module 1026 may be used to enhance understanding and generation of natural language. The natural language processing module 1030 may use the output from the classifier 1027 to tailor the language used in response to a user. The rules-based engineering module 1028 can guide the natural language processing module's use of certain phrases or preferring certain response types. The natural language processing module 1030 may use the learned representations from the neural network 1024 to better understand the semantics of the user's input and generate appropriate responses. The natural language processing module 1030 may help guide the AI-driven search module 1031 by interpreting user inquiries and thereby improving the AI-driven search module's 1031 search effectiveness. The natural language processing module 1030 may gather speech inputs from the computer sensing module 1029 and transcribe and interpret those inputs.

Figure 11:
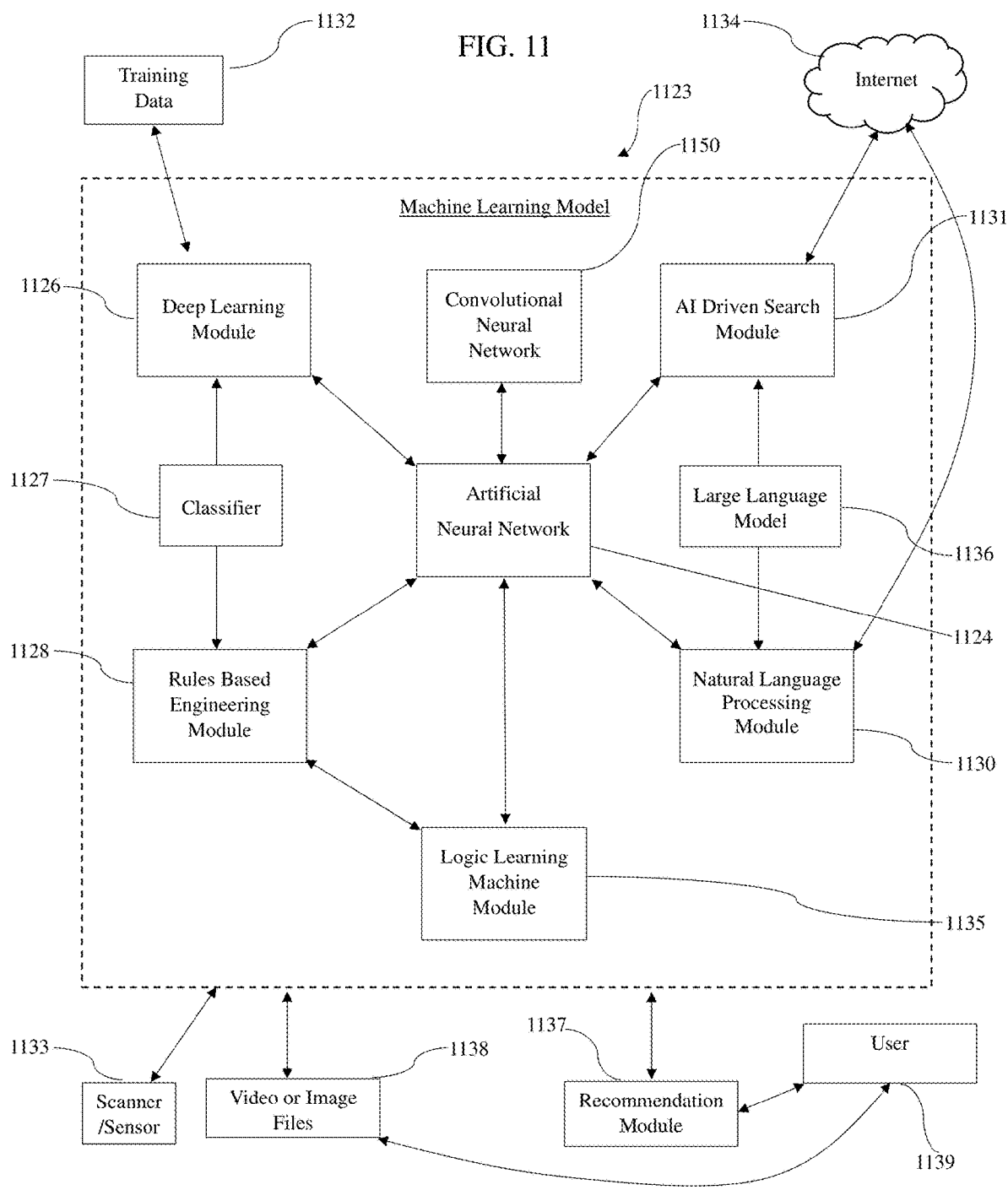
FIG. 11 is another schematic illustration of a machine learning model architecture including an artificial neural network employable by the devices and systems described herein.

Unless otherwise indicated below, the machine learning model 1123 described below with reference to FIG. 11 is substantially the same as the machine learning model 1023 described above with reference to FIG. 10, and thus duplicative descriptions may be omitted below.

FIG. 11 is another schematic illustration of a machine learning model 1123 architecture including an artificial neural network 1124 employable by the devices and systems described herein.

Unless otherwise indicated below, the machine learning model 1123 may be iteratively trained on various data sets in the same manner as is described above with reference to machine learning model 1023, and thus duplicative descriptions may be omitted below. That is, training the machine learning model 1123, as described herein, has the practical application of improving the accuracy and functionality of the predictive outputs of the machine learning model 1123 itself, while also having the practical application of improving the technology of HVAC control. The inventor has found that this provides the further improvement in the technology of HVAC control and temperature regulation by reducing an amount of energy used by an HVAC system by efficiently managing thermal output based on the ever changing thermodynamic characteristics of a particular space, such as different numbers of heat generating people occupying the space at various times.

Referring particularly to FIG. 11, the machine learning model 1123 may include a deep learning module 1126, a classifier 1127, a rules-based engineering model 1128, and/or a logic learning machine module 1135, any of which may be iteratively trained using a training data set, such as a training data set stored in a training data set database (see, e.g., training data database 1132).

The machine learning model 1123 may include an AI driven search module 1131, a large language model 1136, and/or a natural language processing module 1130, any of which may be selectively connected to the internet 1134.

The large language model 1136 may serve a role in enhancing the matching of user preferences (e.g., a particular temperature) with HVAC protocol output. The large language model 1136 can process and interpret natural language, the large language model 1136 may generate comprehensive summaries reflecting a user's 1139 preferences, utilizing structured data from other system modules like the classifier 1127. The large language model 1136 can also refine and improve the prediction of user preferences. Furthermore, the large language model 1136 may assist in processing and understanding user 1139 queries or feedback, facilitating a more interactive and responsive user experience within the devices, systems, and methods described herein.

The large language model may receive structured data and insights from the deep learning module 1126, CNN 1150, and artificial neural network 1124, which analyze HVAC protocol efficiency and effectiveness. Moreover, inputs from the rules-based engineering module 1128 and the logic learning machine module 1135 enable the large language model to adhere to predetermined logic and patterns, ensuring the generated recommended HVAC protocols are maximally efficient and effective for maintaining a desired temperature in a space, and maximizing energy efficiency.

The natural language processing module 1130 may play a role in understanding and generating human language, enabling the system to process and interpret user 1139 inputs, feedback, and textual content within the system and enables the conversation experience with a user 1139. The natural language processing module 1130 may analyze the structured data provided by modules like the convolutional neural network 1150 and the deep learning module 1126, extracting meaningful insights.

The natural language processing module 1130 enhances its functionality through interactions with various other modules, ensuring a robust integration of language understanding and generation capabilities. The natural language processing module 1130 works closely with the large language model to refine the generated response, utilizing the large language model's extensive database of language patterns to produce contextually relevant and coherent text. The natural language processing module 1130 also processes and interprets data from the deep learning module 1126 and the convolutional neural network 1150, translating intricate patterns and visual insights into descriptive textual elements that add depth and detail to the response and potentially provide recommendations to the user 1139. In collaboration with the AI-driven search module 1131, the natural language processing module 1130 optimizes search queries to source the most relevant information. The classifier's 1127 categorizations guide the natural language processing module 1130 in tailoring the textual content to align with the generated response, ensuring a high degree of personalization. Furthermore, the natural language processing module 1130 applies the structured data and logical frameworks developed by the rules-based engineering module 1128 and the logic learning machine module to apply consistent linguistic standards and adapt the user's recommendation to reflect logical deductions, maintaining both clarity and relevance.

The machine learning model 1123 may also include a convolutional neural network (CNN) 1150. In particular, the CNN 1150 can be employed to perform the video analysis described herein. Video analysis may be leveraged by the CNN 1150 to analyze frames to identify and track temperature data in the images.

Figure 12:
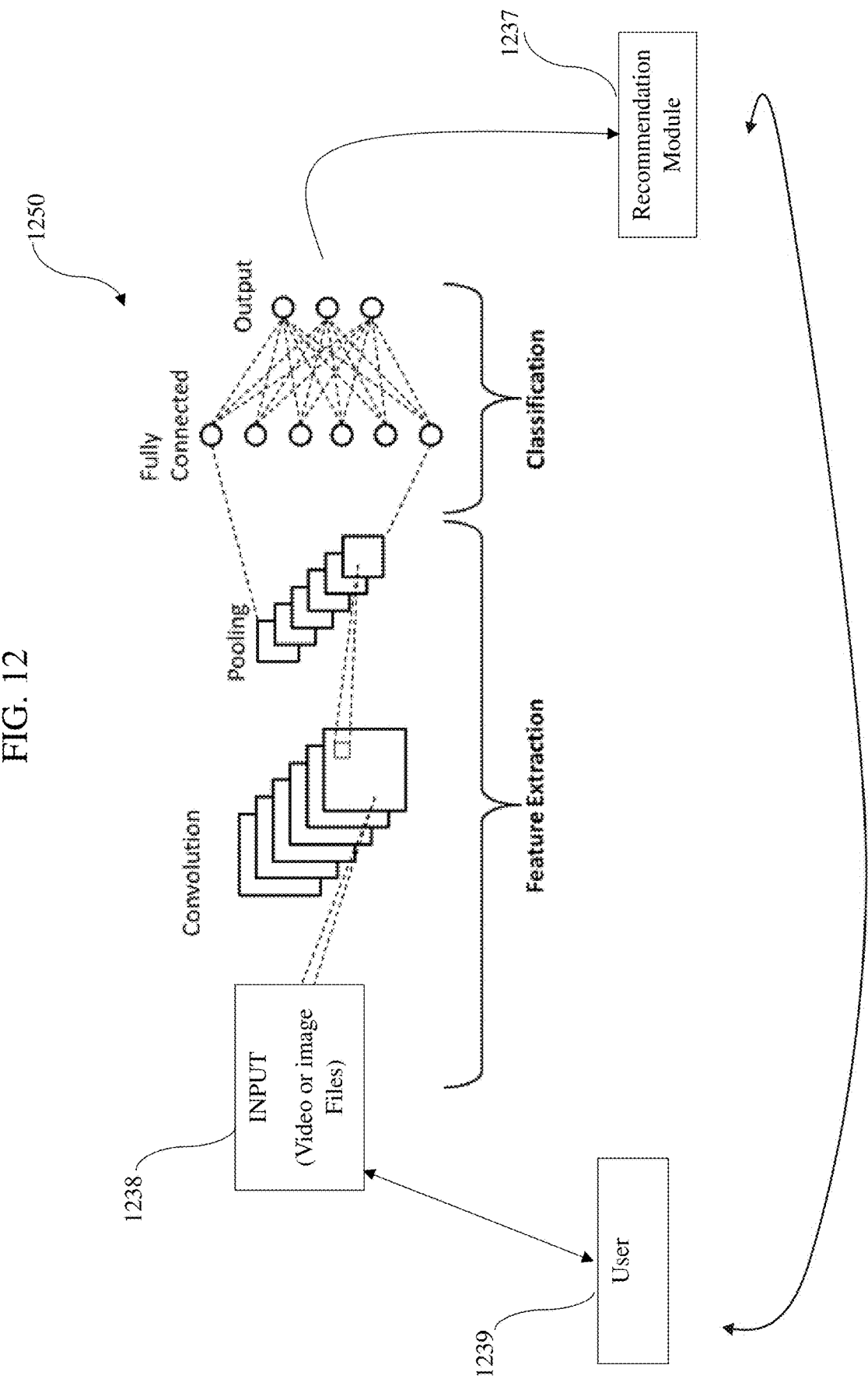
FIG. 12 is a schematic illustration of a convolutional neural network employable by the machine learning models of FIG. 10 or 11 according to aspects of the present disclosure.

FIG. 12 is a schematic illustration of a convolutional neural network 1250 employable by the machine learning models of FIG. 10 or 11 (see, e.g., machine learning model 1023 in FIG. 10, or machine learning model 1123 in FIG. 11) according to aspects of the present disclosure.

Referring particularly to FIG. 12, feature extraction is the process of automatically identifying relevant patterns or features from input data, often through convolutional layers. These layers consist of filters or kernels that slide over the input data, such as images, extracting features such as edges, textures, or shapes. Each filter performs a mathematical operation on the input data, producing feature maps that highlight different aspects of the image. Through the training process, the CNN 1250 learns to adjust the parameters of these filters to extract increasingly complex and meaningful features from the data, particularly temperature data that can be identified image by image or within individual quadrants or regions of each image, such as based on a grid pattern with weights assigned to each segment of the grid pattern.

Pooling is a down sampling technique commonly applied after feature extraction in the CNN 1250. Pooling layers reduce the dimensionality of the feature maps by summarizing the information within local regions. The most common pooling operation is max pooling, where the maximum value within each region is retained while discarding the rest. This process helps to make the learned features more invariant to small variations in the input, reducing computational complexity and preventing overfitting. By iteratively applying feature extraction and pooling layers, the model can hierarchically learn to represent the input data in a way that is conducive to solving the target task, such as image classification or object detection.

Following feature extraction and pooling, the output is typically fed into one or more fully connected layers in the CNN 1250, which may serve as classifiers. These layers take the high-level features extracted from the previous layers and map them to the target classes or categories. During training, the parameters of these layers are optimized through techniques like backpropagation and gradient descent, minimizing the difference between the predicted class probabilities and the actual labels in the training data. In the case of classification tasks, the final layer often employs a SoftMax activation function to produce a probability distribution over the possible classes, allowing the model to make predictions by selecting the class with the highest probability. By leveraging feature extraction, pooling, and classification in conjunction, the CNN 1250 can effectively learn to recognize and classify patterns in complex data such as images, text, or audio.

For example, based on image analysis including temperature data for a space (see, e.g., space 103 in FIG. 1, or space 203 in FIG. 2, or space 303 in FIG. 3, or space 403 in FIG. 4, or space 503 in FIG. 5, or space 603 in FIG. 6), such as a commercial building, the CNN 1250 will generate an output (e.g., an HVAC operating protocol for heat and cooling output) by employing the recommendation module 1237 (see, e.g., recommendation module 1137 in FIG. 11). The recommendation module 1237 may be trained on data, such as training data stored in a database (see, e.g. training data 1132 in FIG. 11). The recommendation module 1237 can then analyze this output (e.g., an HVAC operating protocol for heat and cooling output) to determine HVAC protocol effectiveness and efficiency.

Figure 13:
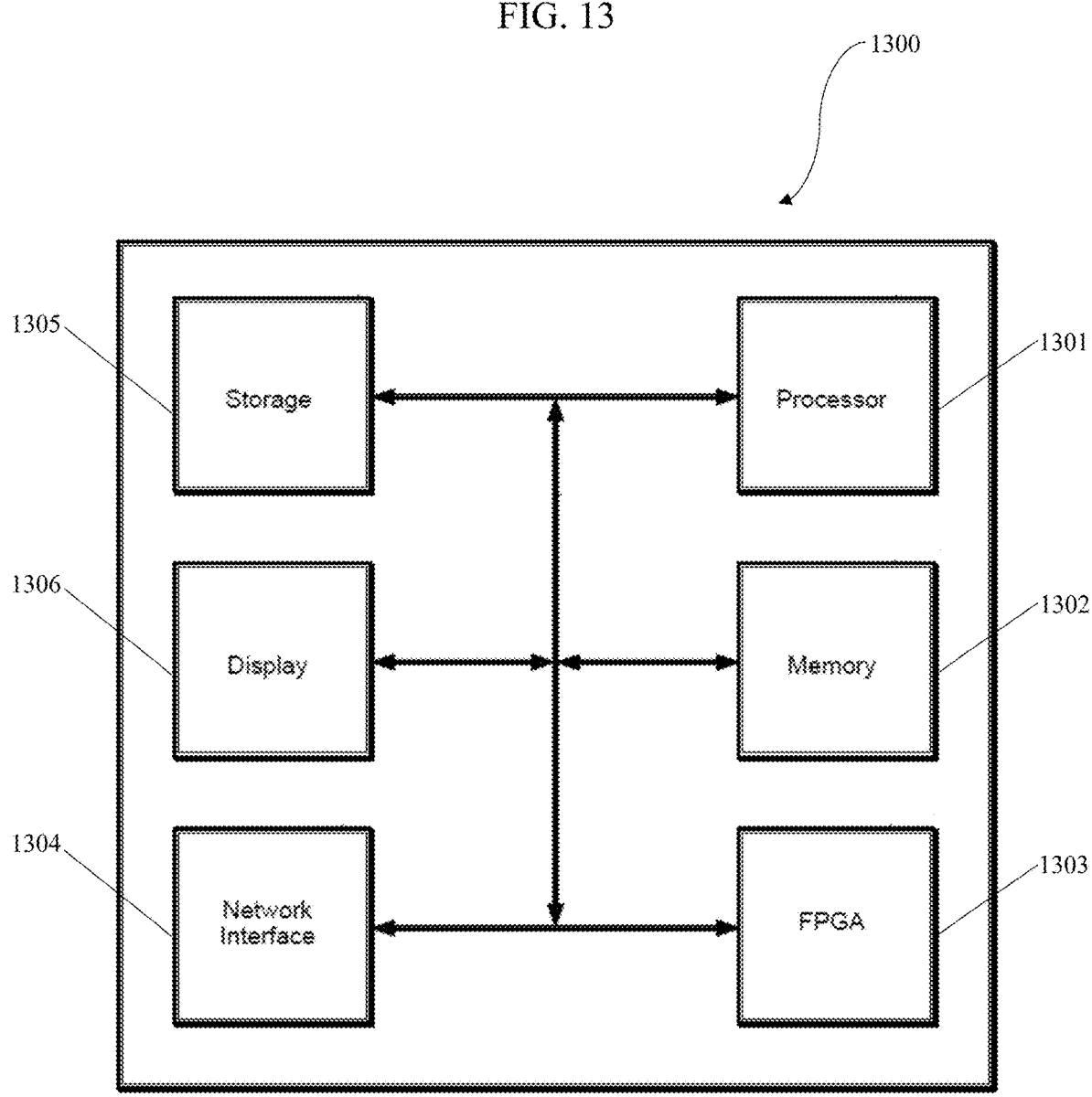
FIG. 13 is a block diagram of an exemplary computer employable by the devices, systems, and methods described herein according to aspects of the present disclosure.

Referring to FIG. 13, a general-purpose computer 1300 employable by the devices, systems, and methods described herein is described. The computers employed by or included in the devices, systems and methods described herein may have the same or substantially the same structure as the computer 1300 or may incorporate at least some of the components of the computer 1300. The general-purpose computer can be employed to perform the various methods and algorithms described herein. The computer 1300 may include a processor 1301 connected to a computer-readable storage medium or a memory 1302 which may be a volatile type memory, e.g., RAM, or a non-volatile type memory, e.g., flash media, disk media, etc. The processor 1301 may be another type of processor such as, without limitation, a digital signal processor, a microprocessor, an ASIC, a graphics processing unit (GPU), field-programmable gate array (FPGA) 1303, or a central processing unit (CPU) or a GPU.

In some aspects of the disclosure, the memory 1302 can be random access memory, read-only memory, magnetic disk memory, solid state memory, optical disc memory, and/or another type of memory. The memory 1302 can communicate with the processor 1301 through communication buses of a circuit board and/or through communication cables such as serial ATA cables or other types of cables. The memory 1302 includes computer-readable instructions that are executable by the processor 1301 to operate the computer 1300 to execute the algorithms described herein. The computer 1300 may include a network interface 1304 to communicate (e.g., through a wired or wireless connection) with other computers or a server. A storage device 1305 may be used for storing data. The computer 1300 may include one or more FPGAs 1303. The FPGA 1303 may be used for executing various machine learning algorithms. A display 1306 may be employed to display data processed by the computer 1300.

Generally, the memory 1302 may store computer instructions executable by the processor 1301 to carry out the various functions described herein.

The computer 1300 may employ various artificial intelligence models, such as one or more machine learning models or algorithms, as described herein.

Figure 14:
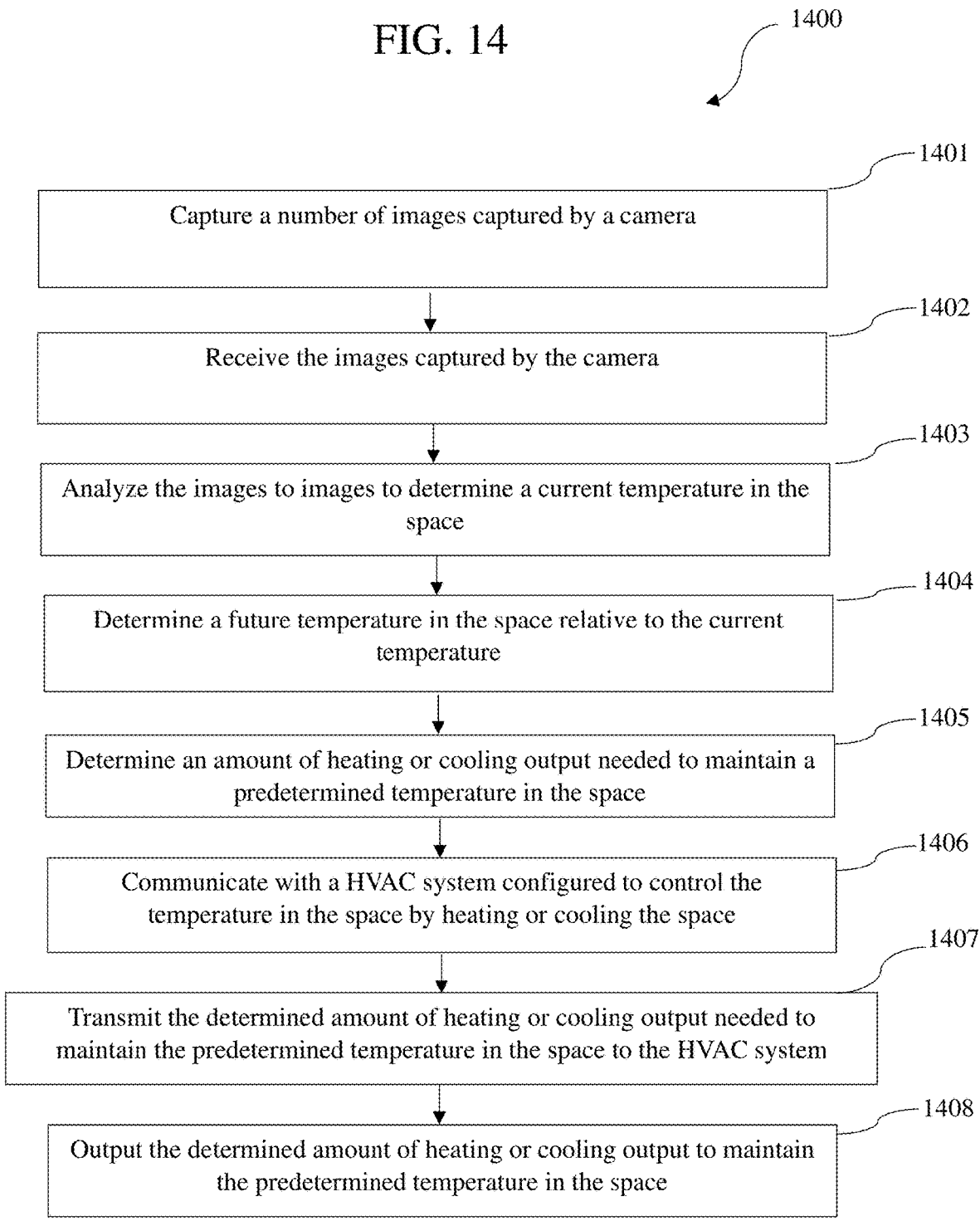
FIG. 14 is a flow chart of a method of controlling an HVAC system according to aspects of the present disclosure.

Referring to FIG. 14, a computer-implemented method for controlling heating, ventilation, and air conditioning (HVAC) systems 1400 includes capturing, by a camera (see, e.g., camera 101 in FIG. 1, or camera 201 in FIG. 2, or camera 301 in FIG. 3, or camera 401 in FIG. 4, or camera 501 in FIG. 5, or camera 601 in FIG. 6), a number of images of a space 1401. The images captured by the camera (e.g., 101, 201, 301, 401, 501, and/or 601) include temperature data for the space. The method includes receiving, at an image analysis module, the images captured by the camera 1402. The method includes analyzing, by the image analysis module, the images to determine a current temperature in the space 1403. The method includes determining, by a computer including at least one processor and at least one memory, a future temperature in the space relative to the current temperature 1404. The method includes determining, by the computer, an amount of heating or cooling output needed to maintain a predetermined temperature in the space 1405. The method includes communicating, by a controller, with a heating, ventilation, and air conditioning (HVAC) system 1406. The HVAC system is configured to control the temperature in the space by heating or cooling the space. The method includes transmitting, by the controller, the determined amount of heating or cooling output needed to maintain the predetermined temperature in the space to the HVAC system to maintain the predetermined temperature in the space 1407. The method includes outputting, by the HVAC system, the determined amount of heating or cooling output to maintain the predetermined temperature in the space 1408.

In an aspect of the present disclosure, the method includes directly measuring, by a temperature sensor (see, e.g., temperature sensor 114 or 154 in FIG. 1, or temperature sensor 214 or 254 in FIG. 2, or temperature sensors 314 or 354 in FIG. 3, or temperature sensor 414 or 454 in FIG. 4, or temperature sensor 514 or 554 in FIG. 5, or temperature sensor 614 or 654 in FIG. 6) in communication with the computer (see, e.g., computer 106 in FIG. 1, or computer 206 in FIG. 2, or computer 306 in FIG. 3, or computer 406 in FIG. 4, or computer 506 in FIG. 5, or computer 606 in FIG. 6, or computer 1300 in FIG. 13), the current temperature in the space.

In an aspect of the present disclosure, the temperature sensor (see, e.g., temperature sensor 114 in FIG. 1, or temperature sensor 214 in FIG. 2, or temperature sensor 314 in FIG. 3, or temperature sensor 414 in FIG. 4, or temperature sensor 514 in FIG. 5, or temperature sensor 614 in FIG. 6) is a digital temperature sensor, an analog temperature sensor, a thermocouple, a resistance temperature detector, a USB temperature sensor, a Wi-Fi® temperature sensor, or a Bluetooth® temperature sensor.

In an aspect of the present disclosure, the method includes analyzing, by an air analysis device (see, e.g., air analysis device 122 in FIG. 1, or air analysis device 222 in FIG. 2, or air analysis device 322 in FIG. 3, or air analysis device 422 in FIG. 4, or air analysis device 522 in FIG. 5, or air analysis device 622 in FIG. 6) in communication with the computer (see, e.g., computer 106 in FIG. 1, or computer 206 in FIG. 2, or computer 306 in FIG. 3, or computer 406 in FIG. 4, or computer 506 in FIG. 5, or computer 606 in FIG. 6, or computer 1300 in FIG. 13), at least one of particulate matter, carbon dioxide, carbon monoxide, nitrogen dioxide, ozone, volatile organic compounds, humidity, temperature, formaldehyde, radon, air pressure, or smoke.

Figure 15:
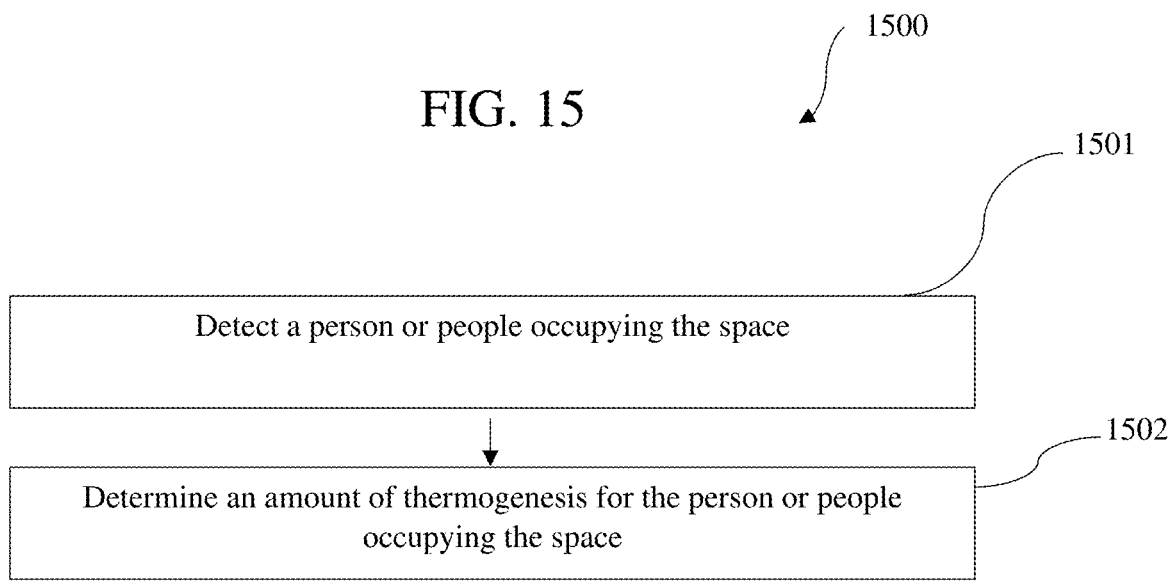
FIG. 15 is a flow chart of another method of controlling an HVAC system according to aspects of the present disclosure.

Referring to FIG. 15, the method 1500 includes detecting, by the image analysis module (see, e.g., image analysis module 104 in FIG. 1, or image analysis module 204 in FIG. 2, or image analysis module 304 in FIG. 3, or image analysis module 404 in FIG. 4, or image analysis module 504 in FIG. 5, or image analysis module 604 in FIG. 6), a person or people occupying the space 1501. The method includes determining, by the image analysis module (e.g., 104, 204, 304, 404, 504, and/or 604), an amount of thermogenesis for the person or people occupying the space 1502.

Figure 16:
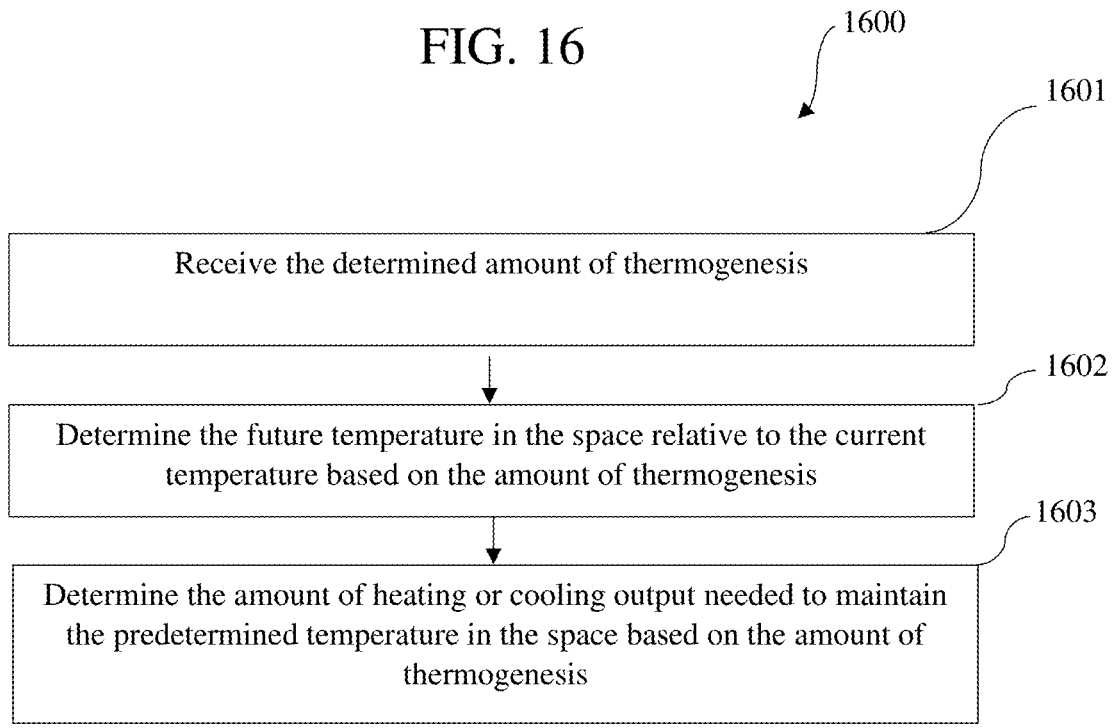
FIG. 16 is a flow chart of another method of controlling an HVAC system according to aspects of the present disclosure.

Referring to FIG. 16, the method 1600 includes receiving, by the computer (see, e.g., computer 106 in FIG. 1, or computer 206 in FIG. 2, or computer 306 in FIG. 3, or computer 406 in FIG. 4, or computer 506 in FIG. 5, or computer 606 in FIG. 6, or computer 1300 in FIG. 13), the amount of thermogenesis determined by the image analysis module 1601. The method includes determining, by the computer (e.g., 106, 206, 306, 406, 506, 606, and/or 1300), the future temperature in the space relative to the current temperature based on the amount of thermogenesis determined by the image analysis module 1602. The method includes determining, by the computer (e.g., 106, 206, 306, 406, 506, 606, and/or 1300), the amount of heating or cooling output needed to maintain the predetermined temperature in the space based on the amount of thermogenesis determined by the image analysis module 1603.

Figure 17:
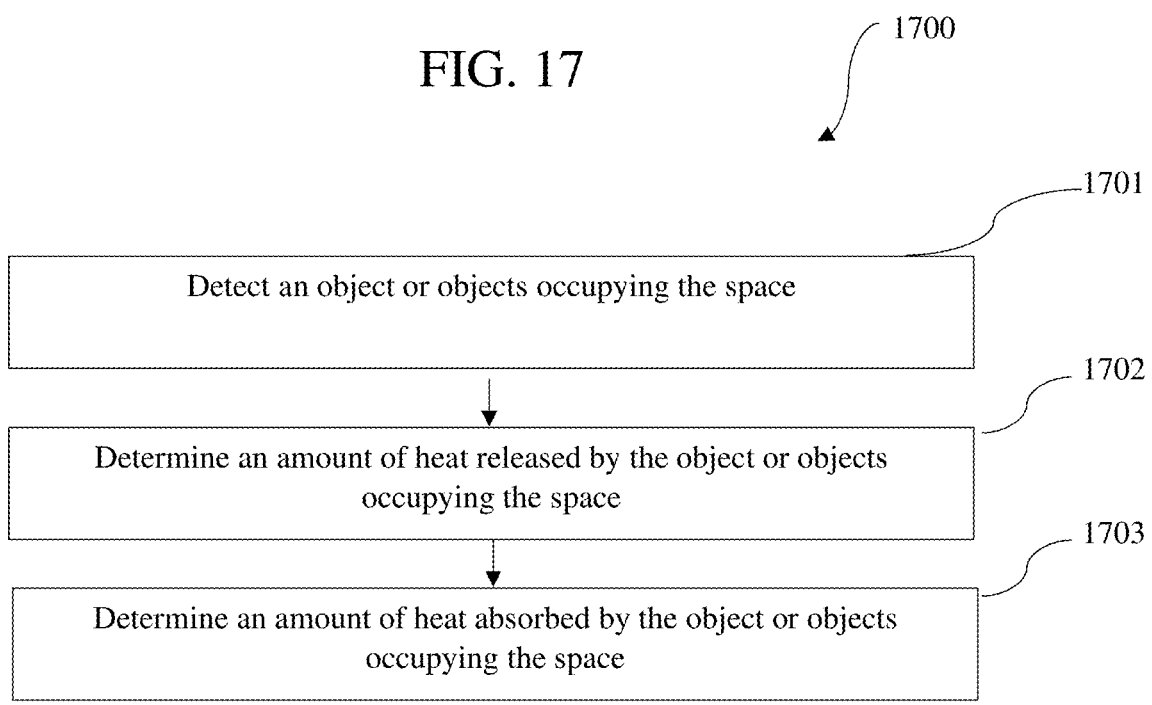
FIG. 17 is a flow chart of another method of controlling an HVAC system according to aspects of the present disclosure.

Referring to FIG. 17, the method 1700 includes detecting, by the image analysis module, an object or objects occupying the space 1701. The method includes determining, by the image analysis module, an amount of heat released by the object or objects occupying the space 1702. The method includes determining, by the image analysis module (see, e.g., image analysis module 104 in FIG. 1, or image analysis module 204 in FIG. 2, or image analysis module 304 in FIG. 3, or image analysis module 404 in FIG. 4, or image analysis module 504 in FIG. 5, or image analysis module 604 in FIG. 6), an amount of heat absorbed by the object or objects occupying the space 1703.

Figure 18A:
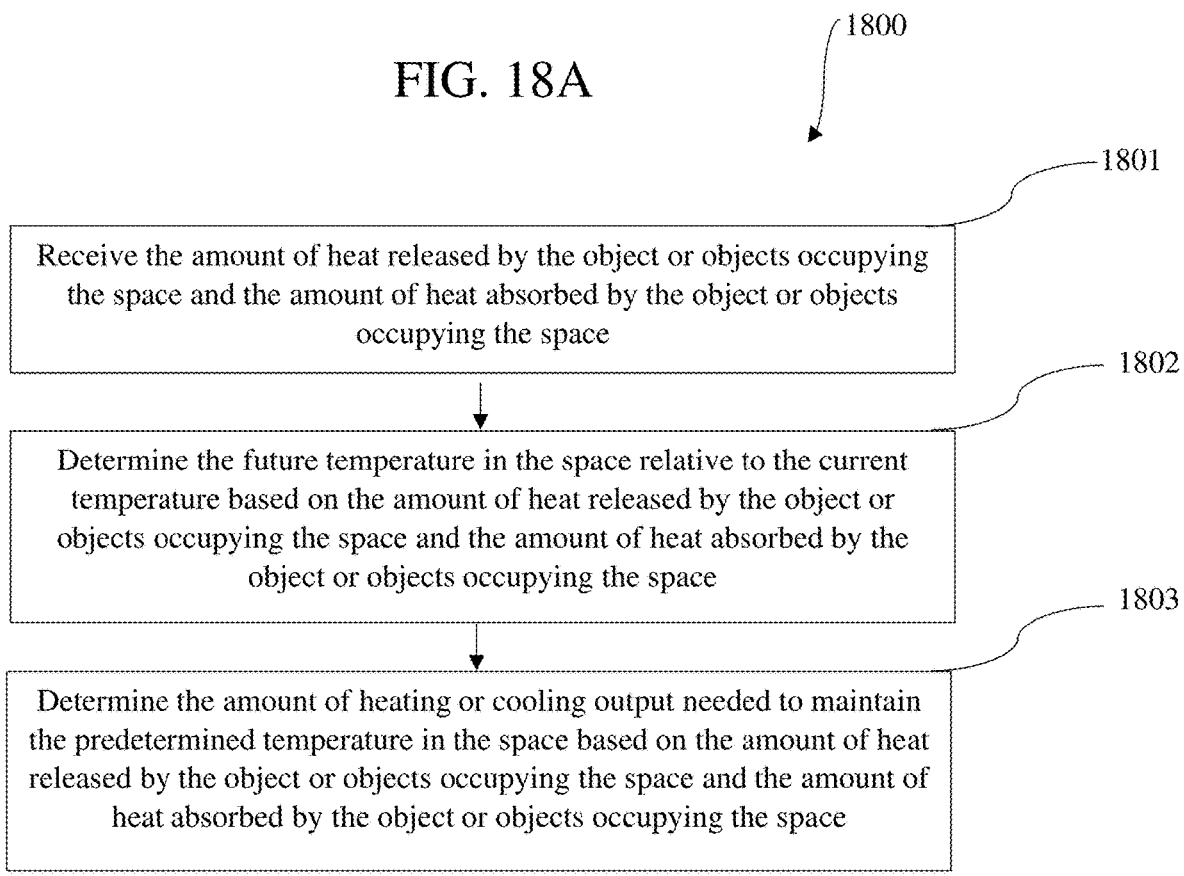
FIG. 18A is a flow chart of another method of controlling an HVAC system according to aspects of the present disclosure.

Referring to FIG. 18A, method 1800 includes receiving, by the computer (see, e.g., computer 106 in FIG. 1, or computer 206 in FIG. 2, or computer 306 in FIG. 3, or computer 406 in FIG. 4, or computer 506 in FIG. 5, or computer 606 in FIG. 6, or computer 1300 in FIG. 13), the amount of heat released by the object or objects occupying the space and the amount of heat absorbed by the object or objects occupying the space determined by the image analysis module 1801. The method includes determining, by the computer, the future temperature in the space relative to the current temperature based on the amount of heat released by the object or objects occupying the space and the amount of heat absorbed by the object or objects occupying the space 1802. The method includes determining, by the computer, the amount of heating or cooling output needed to maintain the predetermined temperature in the space based on the amount of heat released by the object or objects occupying the space and the amount of heat absorbed by the object or objects occupying the space 1803.

Figure 18B:
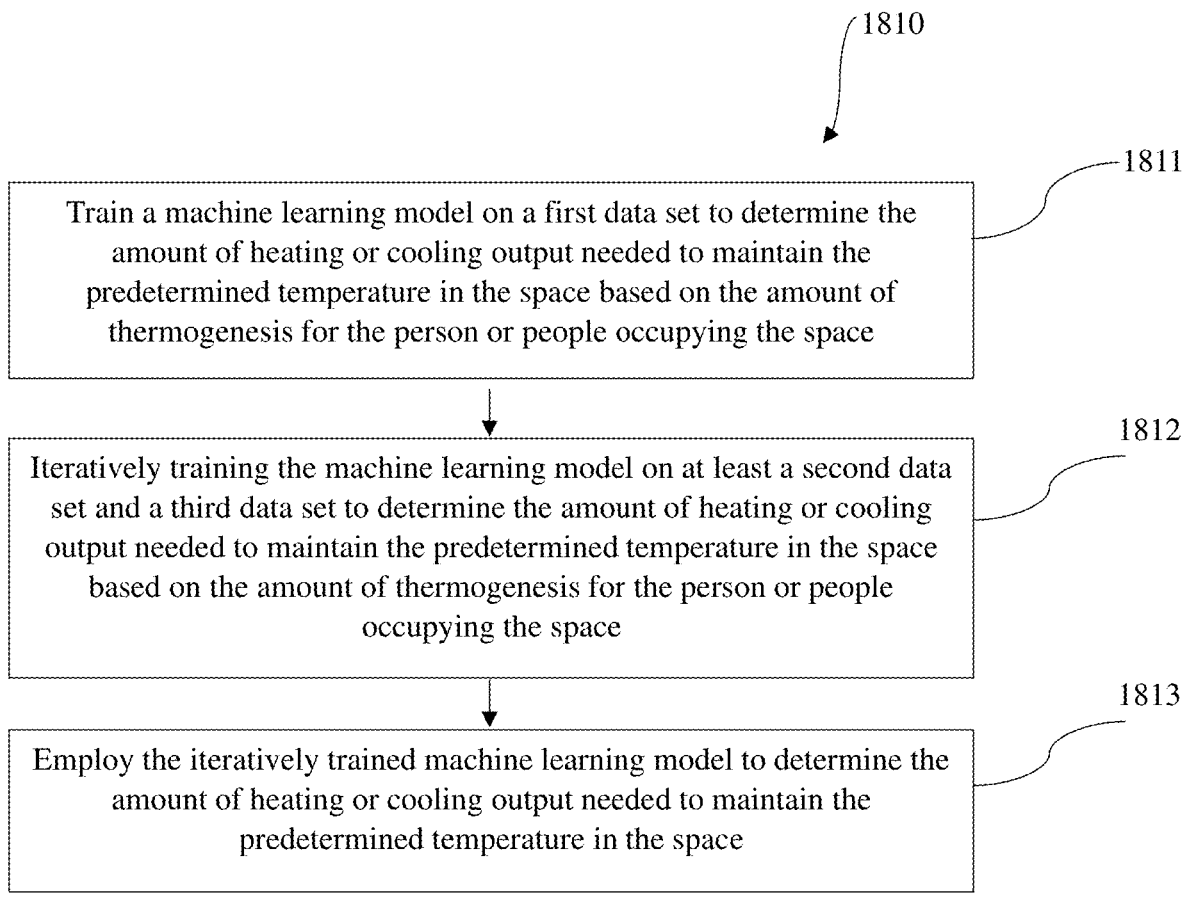
FIG. 18B is a flow chart of another method of controlling an HVAC system according to aspects of the present disclosure.

Referring to FIG. 18B, in method 1810, the computer employs the artificial neural network of the machine learning model to determine the amount of thermogenesis for the person or people occupying the space. The machine learning model is trained to determine the amount of thermogenesis for the person or people occupying the space by training the machine learning model on a first data set to determine the amount of heating or cooling output needed to maintain the predetermined temperature in the space based on the amount of thermogenesis for the person or people occupying the space 1811. The machine learning model is further trained by iteratively training the machine learning model on at least a second data set and a third data set to determine the amount of heating or cooling output needed to maintain the predetermined temperature in the space based on the amount of thermogenesis for the person or people occupying the space 1812. Iteratively training the machine learning model on at least the second data set and the third data set increases predictive accuracy of the machine learning model with respect to training the machine learning model on the first data set. The amount of heating or cooling output needed to maintain the predetermined temperature in the space is determined by employing the iteratively trained machine learning model 1813.

The artificial neural network of the machine learning model may be similarly employed to evaluate the thermodynamic characteristics of non-human objects or items in a particular space in the same manner in which the thermodynamic characteristics of one or more people is evaluated. The thermodynamic characteristics of objects and/or people may be determined individually or in conjunction with each other by the artificial neural network of the machine learning model.

Referring generally to FIGS. 14 to 18A, a machine learning model (see, e.g., machine learning model 1023 in FIG. 10, or machine learning model 1123 in FIG. 11) is in communication with the computer (see, e.g., computer 106 in FIG. 1, or computer 206 in FIG. 2, or computer 306 in FIG. 3, or computer 406 in FIG. 4, or computer 506 in FIG. 5, or computer 606 in FIG. 6, or computer 1300 in FIG. 13) and/or the image analysis module (see, e.g., image analysis module 104 in FIG. 1, or image analysis module 204 in FIG. 2, or image analysis module 304 in FIG. 3, or image analysis module 404 in FIG. 4, or image analysis module 504 in FIG. 5, or image analysis module 604 in FIG. 6). The machine learning model (see, e.g., machine learning model 1023 in FIG. 10, or machine learning model 1123 in FIG. 11) includes an artificial neural network (see, e.g., neural network 1024 in FIG. 10, or artificial neural network 1124 in FIG. 11) that analyzes the images and determines the future temperature in the space (see, e.g., space 103 in FIG. 1, or space 203 in FIG. 2, or space 303 in FIG. 3, or space 403 in FIG. 4, or space 503 in FIG. 5, or space 603 in FIG. 6).

In an aspect of the present disclosure, the camera (see, e.g., camera 101 in FIG. 1, or camera 201 in FIG. 2, or camera 301 in FIG. 3, or camera 401 in FIG. 4, or camera 501 in FIG. 5, or camera 601 in FIG. 6) includes a camera configured to capture video images, and the images captured by the camera are captured as part of a video image.

In an aspect of the present disclosure, the method includes determining, by the image analysis module (see, e.g., image analysis module 104 in FIG. 1, or image analysis module 204 in FIG. 2, or image analysis module 304 in FIG. 3, or image analysis module 404 in FIG. 4, or image analysis module 504 in FIG. 5, or image analysis module 604 in FIG. 6), the current temperature of the space in real-time.

In an aspect of the present disclosure, the camera (see, e.g., camera 101 in FIG. 1, or camera 201 in FIG. 2, or camera 301 in FIG. 3, or camera 401 in FIG. 4, or camera 501 in FIG. 5, or camera 601 in FIG. 6) employed in the method includes at least one of a thermal imaging camera 131, an infrared camera 132, a thermographic camera 133, a laser thermometer camera 134, a radiometric camera 135, or a thermal sensor camera 136.

In an aspect of the present disclosure, the method includes communicating between the controller (see, e.g., controller 112 in FIG. 1, or controller 212 in FIG. 2, or controller 312 in FIG. 3, or controller 412 in FIG. 4, or controller 512 in FIG. 5, or controller 612 in FIG. 6) and the HVAC system (see, e.g., HVAC system 113 in FIG. 1, or HVAC system 213 in FIG. 2, or HVAC system 313 in FIG. 3, or HVAC system 413 in FIG. 4, or HVAC system 513 in FIG. 5, or HVAC system 613 in FIG. 6) through a wireless transmitter (see, e.g., wireless transmitter 137 in FIG. 1, or wireless transmitter 237 in FIG. 2, or wireless transmitter 337 in FIG. 3, or wireless transmitter 437 in FIG. 4, or wireless transmitter 537 in FIG. 5, or wireless transmitter 637 in FIG. 6).

In an aspect of the present disclosure, the controller (see, e.g., controller 112 in FIG. 1, or controller 212 in FIG. 2, or controller 312 in FIG. 3, or controller 412 in FIG. 4, or controller 512 in FIG. 5, or controller 612 in FIG. 6) communicates with the HVAC system (see, e.g., HVAC system 113 in FIG. 1, or HVAC system 213 in FIG. 2, or HVAC system 313 in FIG. 3, or HVAC system 413 in FIG. 4, or HVAC system 513 in FIG. 5, or HVAC system 613 in FIG. 6) by a Wi-Fi®, Bluetooth®, or cellular network connection.

In an aspect of the present disclosure, the HVAC system (see, e.g., HVAC system 113 in FIG. 1, or HVAC system 213 in FIG. 2, or HVAC system 313 in FIG. 3, or HVAC system 413 in FIG. 4, or HVAC system 513 in FIG. 5, or HVAC system 613 in FIG. 6) includes a wireless transmitter (see, e.g., wireless transmitter 138 in FIG. 1, or wireless transmitter 238 in FIG. 2, or wireless transmitter 338 in FIG. 3, or wireless transmitter 438 in FIG. 4, or wireless transmitter 538 in FIG. 5, or wireless transmitter 638 in FIG. 6), and the HVAC system (see, e.g., HVAC system 113 in FIG. 1, or HVAC system 213 in FIG. 2, or HVAC system 313 in FIG. 3, or HVAC system 413 in FIG. 4, or HVAC system 513 in FIG. 5, or HVAC system 613 in FIG. 6) communicates with the controller (see, e.g., controller 112 in FIG. 1, or controller 212 in FIG. 2, or controller 312 in FIG. 3, or controller 412 in FIG. 4, or controller 512 in FIG. 5, or controller 612 in FIG. 6) through the wireless transmitter (see, e.g., wireless transmitter 138 in FIG. 1, or wireless transmitter 238 in FIG. 2, or wireless transmitter 338 in FIG. 3, or wireless transmitter 438 in FIG. 4, or wireless transmitter 538 in FIG. 5, or wireless transmitter 638 in FIG. 6).

In an aspect of the present disclosure, the computer (see, e.g., computer 106 in FIG. 1, or computer 206 in FIG. 2, or computer 306 in FIG. 3, or computer 406 in FIG. 4, or computer 506 in FIG. 5, or computer 606 in FIG. 6, or computer 1300 in FIG. 13) communicates with a cloud-based server (see, e.g., cloud-based server 140 in FIG. 1, or cloud-based server 240 in FIG. 2, or cloud-based server 340 in FIG. 3, or cloud-based server 440 in FIG. 4, or cloud-based server 540 in FIG. 5, or cloud-based server 640 in FIG. 6) through the wireless transmitter (see, e.g., wireless transmitter 139 in FIG. 1, or wireless transmitter 239 in FIG. 2, or wireless transmitter 339 in FIG. 3, or wireless transmitter 439 in FIG. 4, or wireless transmitter 539 in FIG. 5, or wireless transmitter 639 in FIG. 6).

In an aspect of the present disclosure, the wireless transmitter (see, e.g., wireless transmitter 139 in FIG. 1, or wireless transmitter 239 in FIG. 2, or wireless transmitter 339 in FIG. 3, or wireless transmitter 439 in FIG. 4, or wireless transmitter 539 in FIG. 5, or wireless transmitter 639 in FIG. 6) communicates with the cloud-based server (see, e.g., cloud-based server 140 in FIG. 1, or cloud-based server 240 in FIG. 2, or cloud-based server 340 in FIG. 3, or cloud-based server 440 in FIG. 4, or cloud-based server 540 in FIG. 5, or cloud-based server 640 in FIG. 6) through an internet or cellular network connection.

In an aspect of the present disclosure, the machine learning model (see, e.g., machine learning model 1023 in FIG. 10, or machine learning model 1123 in FIG. 11) includes a convolutional neural network (CNN) (see, e.g., convolutional neural network 1150 in FIG. 11, or convolutional neural network 1250 in FIG. 12) in communication with the artificial neural network (see, e.g., neural network 1024 in FIG. 10, or artificial neural network 1124 in FIG. 11). The CNN (e.g., 1150 and/or 1250) parses the images to determine the current or the future temperature in the space.

Figure 20:
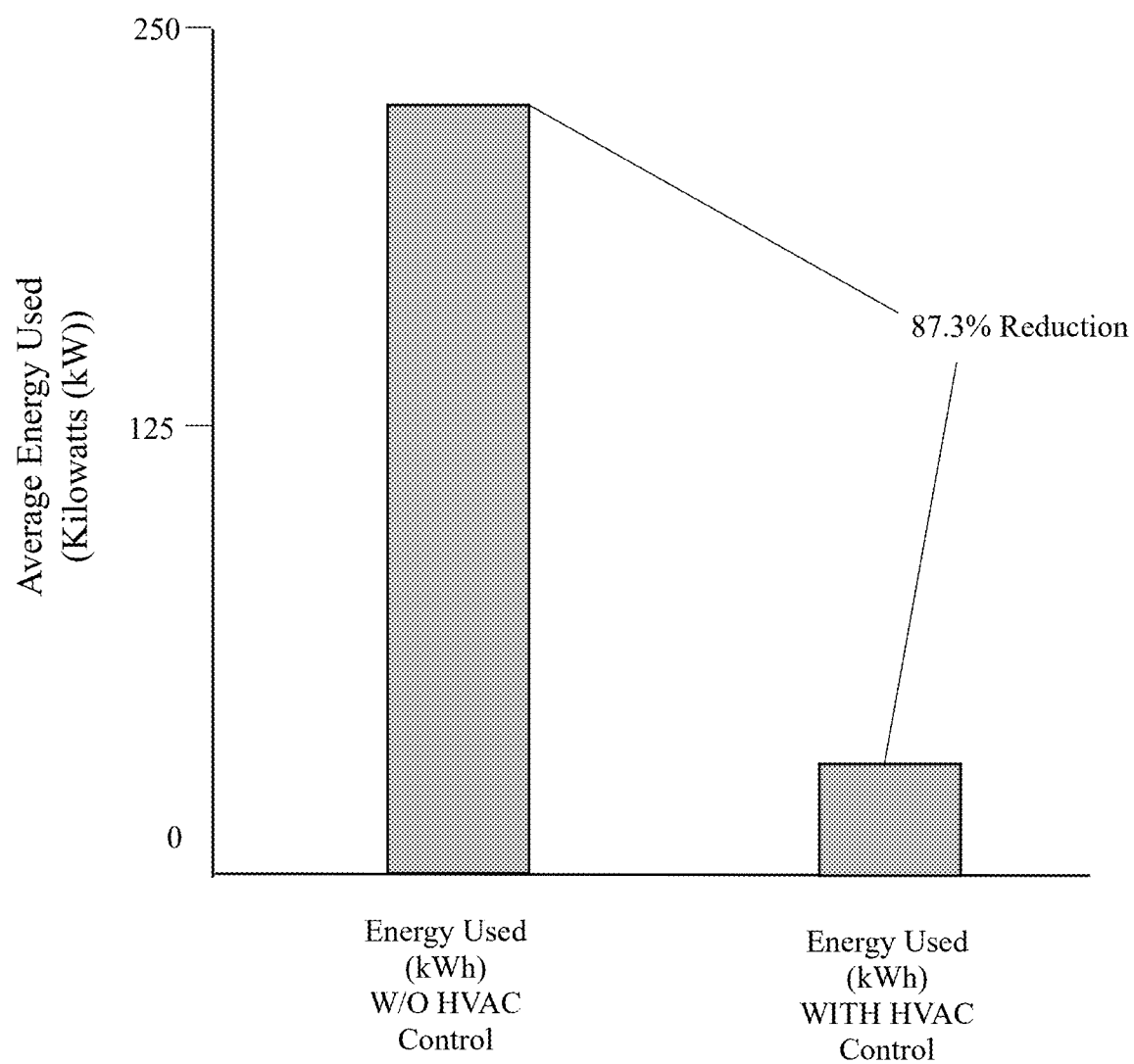
FIG. 20 illustrates exemplary data comparing energy usage with and without HCAC control during extended daily usage according to aspects of the present disclosure.

FIG. 19 illustrates a graph 1900 of exemplary data comparing energy usage with and without HCAC control during overnight usage (e.g., from 10 μm to 5 am local time) according to aspects of the present disclosure. FIG. 20 illustrates a graph 2000 of exemplary data comparing energy usage with and without HCAC control during extended daily usage (e.g., from 4 am to 10 pm local time) according to aspects of the present disclosure. FIG. 21 illustrates a graph 2100 of exemplary data comparing energy usage with and without HCAC control during daily usage (e.g., from 8 am to 5 pm local time) according to aspects of the present disclosure.

Referring to FIGS. 19 to 21, the exemplary data displayed is based on energy usage captured at 5 minute intervals.

The devices, systems, and methods described herein can be employed to control fan speed and/or mode of the HVAC systems described herein. For example, fan speed may be increased or decreased to maintain the desired temperature in a space.

The devices, systems, and methods described herein can be employed to monitor and detect inefficiencies, potential upcoming failures, or actual failures of various physical components of HVAC systems. For example, if a fan is determined to be operating at reduced efficiency or to not be working at all, an alert may be sent by the device or system to a user to repair or replace the component(s) of the corresponding HVAC system.

Figure 22A:
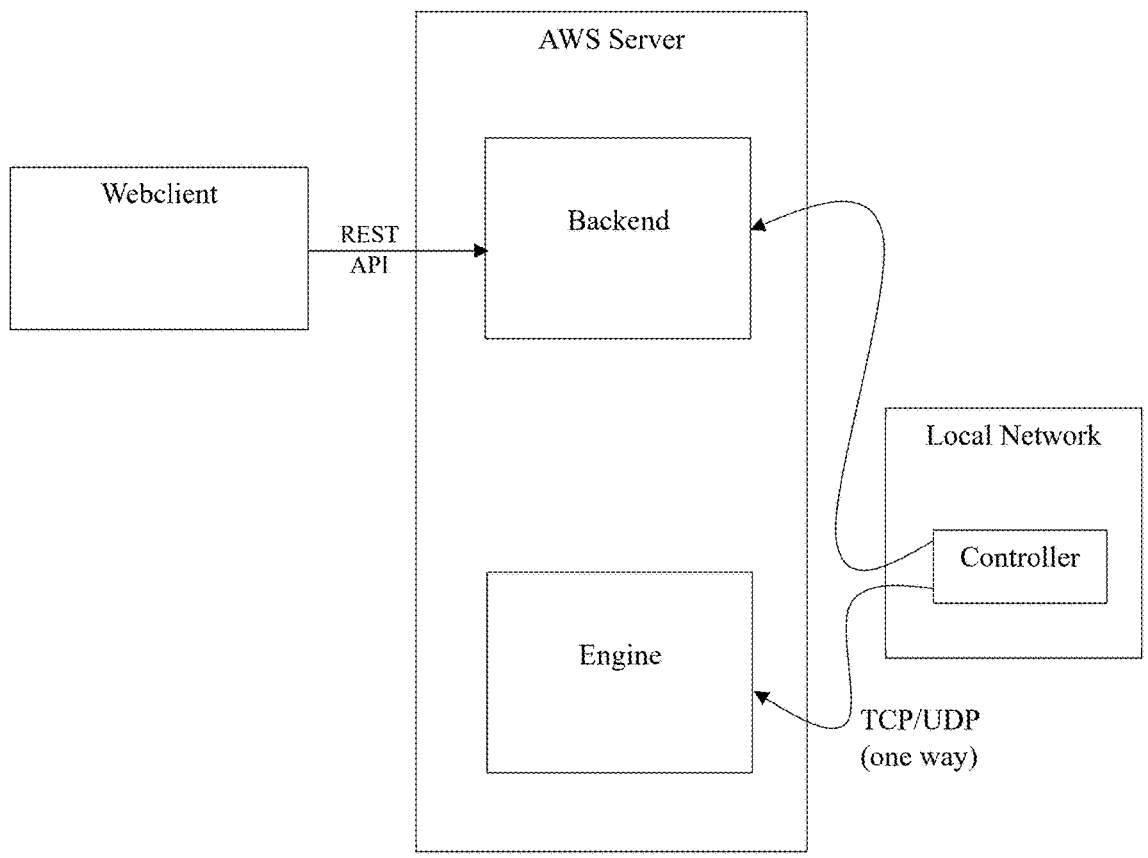
FIGS. 22A, 22B, and 22C are flow charts illustrating exemplary data flow employable by the systems described herein.
Figure 22B:
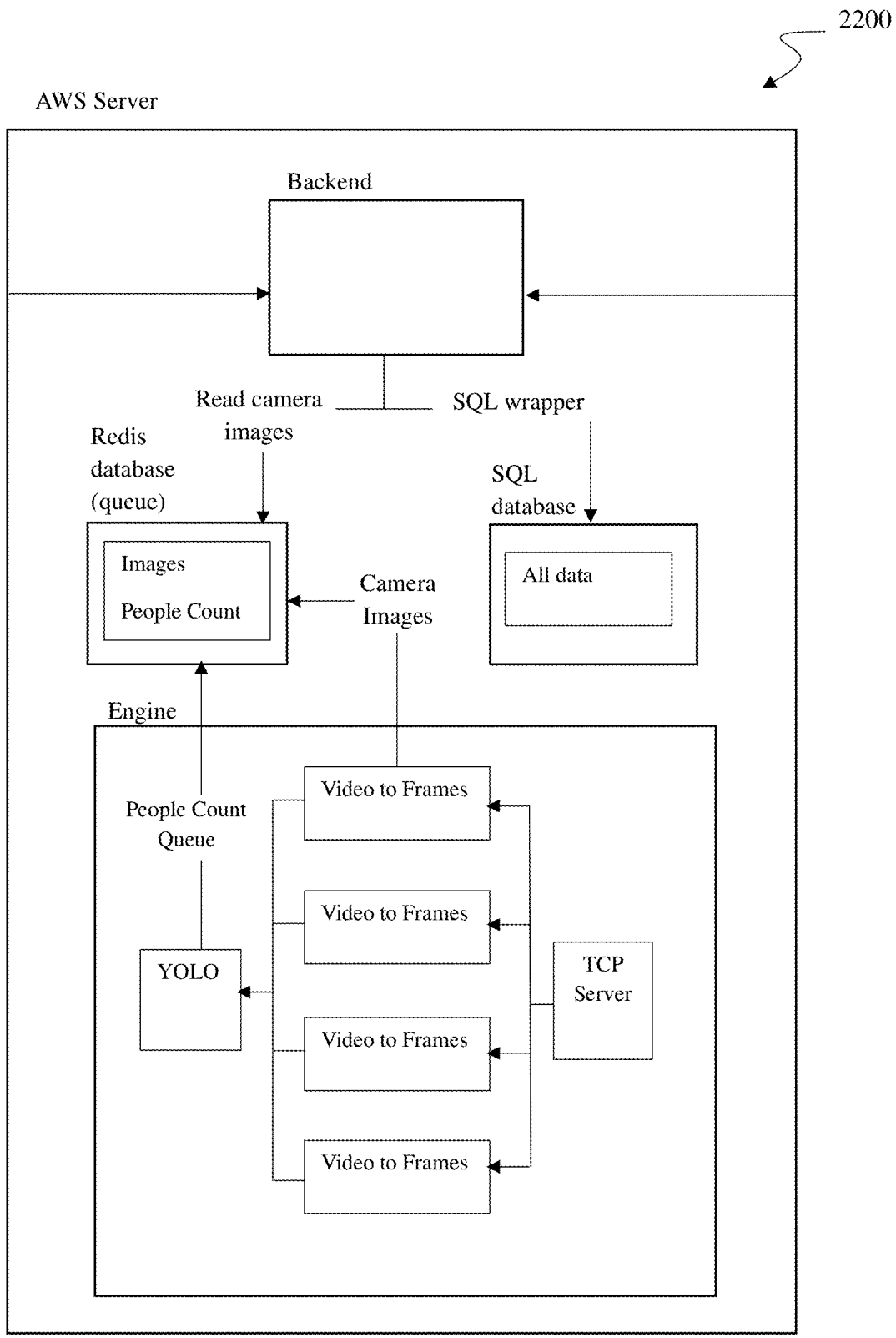
Figure 22C:
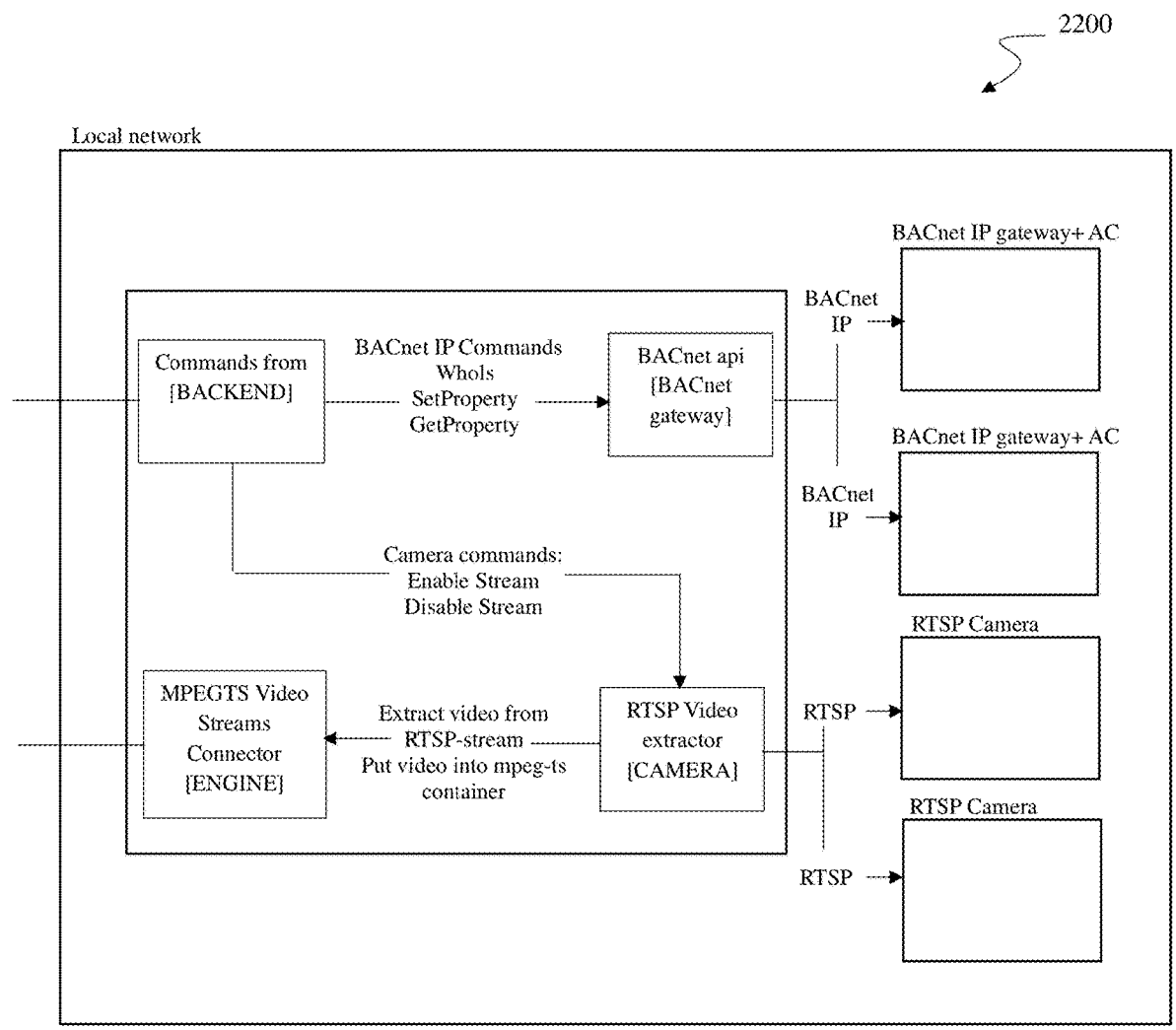

Referring to FIGS. 22A to 22C, a system 2200 may employ the illustrated data flow for determining a needed heat or cold output of an HVAC system to maintain a predetermined temperature in a space, as described herein.

Referring particularly to FIGS. 22A to 22C, the system described herein may employ a software-based user interface (UI framework) on the frontend to render and provide an updatable graphical user interface. The framework provides an abstraction layer that decouples UI logic from application logic, thereby enhancing modularity, scalability, and cross-platform compatibility.

The framework may include the following components:

A Core Rendering Engine. The Core Rendering Engine is a high-performance rendering engine that converts abstract UI component definitions into visual representations on a target display device. The rendering engine is designed to support multiple rendering backends (e.g., raster graphics, vector graphics, GPU-accelerated pipelines) and adapt to varying device specifications.

A Component Library. The Component Library is a pre-defined set of reusable UI components (e.g., buttons, input fields, containers, menus) that are implemented using a declarative programming paradigm. Each component is defined by a structured data schema that specifies its visual properties, behavior, and interaction capabilities.

An Event Handling Subsystem: The Event Handling Subsystem is an event-driven architecture for capturing, propagating, and managing user interactions (e.g., touch, mouse clicks, keyboard inputs). The subsystem employs a hierarchical event propagation model, enabling the delegation and interception of events at different levels of the UI hierarchy.

A Thematic Customization Module. The Thematic Customization Module is a styling mechanism that applies dynamic theming to UI components using a hierarchical stylesheet syntax (e.g., cascading style rules or JSON-based schemas). This module ensures consistent appearance across components and allows real-time customization.

A Data Binding Interface. The Data Binding Interface is a bi-directional data binding mechanism that synchronizes the state of UI components with underlying application data models. The interface supports reactive programming paradigms to automatically update UI components in response to changes in the application state.

A Cross-Platform Integration Layer. The Cross-Platform Integration Layer is an abstraction layer that provides compatibility with multiple operating systems and device architectures. This layer translates UI framework calls into platform-specific instructions, enabling seamless execution on web browsers, desktop environments, and mobile devices.

Development Tools and APIs. The Development Tools and APIs is a suite of tools, including visual editors, debugging utilities, and extensible APIs, designed to streamline the development, testing, and deployment of UI-based applications. The APIs expose functionality for component creation, event registration, and runtime modifications.

The UI framework is extensible, allowing development of custom components, integrate third-party libraries, and optimize performance for specific application requirements. Additionally, it incorporates mechanisms for accessibility compliance, such as screen reader compatibility and keyboard navigation support.

With ongoing reference to FIGS. 22A to 22C, in particular, the system described herein may employ a backend architecture including a Main API Service. The Main API Service serves as the central interface for external applications and systems to interact with the software system. It provides a standardized set of endpoints designed to facilitate communication and data exchange. The service implements request-response mechanisms, supporting various methods such as GET, POST, PUT, and DELETE. It performs validation, authentication, and authorization for incoming requests to ensure data integrity and security. The Main API Service acts as an intermediary between clients and underlying business logic, orchestrating calls to subsidiary services, including the Adjust Temperature Service and the Base Temperature Service, to fulfill complex workflows. Additionally, it supports extensibility through versioning and modular plugin architecture to accommodate future enhancements.

The Adjust Temperature Service is responsible for dynamically modifying temperature values based on user-defined inputs or preconfigured rules. It utilizes an algorithmic approach to calculate adjustments by applying factors such as time, environmental conditions, or specific operational parameters. This service can interface with sensors or external monitoring systems to retrieve real-time data and adjust the target temperature accordingly. The service is also capable of resolving conflicts in overlapping adjustment requests through priority-based scheduling. Output from the Adjust Temperature Service is communicated back to the Main API Service for integration into higher-order system functions or directly to physical devices for immediate implementation.

The Base Temperature Service provides foundational temperature data used as a reference point by other system components, including the Adjust Temperature Service. This service maintains a repository of predefined temperature values, which may be static or derived from historical data analysis. It supports functions such as retrieving, updating, and resetting base temperature values. The Base Temperature Service ensures consistency by enforcing constraints such as permissible temperature ranges and compliance with predefined standards. It interacts with databases or external APIs to synchronize base temperature data across the software system, providing a reliable baseline for all temperature-related operations.

These services collectively enable a robust and scalable system for managing temperature adjustments and related functionalities.

With ongoing reference to FIGS. 22A to 22C, in particular, the system described herein may employ an engine architecture including a computer vision module configured to evaluate a space to regulate the temperature of the space. The devices, systems, and methods described herein may employ a computer vision model integrated with an HVAC control framework to dynamically detect the number of people in a space and adjust HVAC parameters accordingly. The system leverages advanced deep learning techniques to process video streams or images from visual sensors (e.g., cameras), providing real-time occupancy estimates to enhance energy efficiency and occupant comfort.

An exemplary system architecture is described below in more detail.

A sensor module including optical sensors (e.g., RGB cameras, infrared cameras, or depth cameras) are deployed to capture images or video streams. The sensors are strategically positioned in one or various locations throughout a space to provide maximum coverage of the room, accounting for potential occlusions and variations in lighting.

A Computer Vision Model (e.g., a model employed by the artificial neural networks described herein) including a deep learning model, such as a Convolutional Neural Network (CNN) or a Vision Transformer (ViT), specifically trained for human detection and counting. The computer vision model may employ a training dataset. The training dataset is a diverse dataset including annotated images of various room configurations, lighting conditions, and human poses is used. The dataset includes scenarios with occlusions and overlapping individuals to improve robustness. The computer vision model may employ preprocessing of input images such that the input images are resized and normalized to match the input dimensions required by the model, with optional augmentation techniques (e.g., rotation, scaling, or brightness adjustments) applied during training to enhance generalization.

The computer vision model may include feature extraction layers that capture spatial patterns indicative of human presence. A dense prediction head outputs the estimated number of occupants based on detected features. Post-processing algorithms, such as Non-Maximum Suppression (NMS), may be employed to ensure accurate counting of occupants by removing redundant detections.

A occupancy detection pipeline may employ image segmentation, such as semantic segmentation, to distinguish individuals from the background and identify their positions. As an example, a 3-dimensional volumetric analysis may be performed of a space to determine thermal outputs of each individual, object, device, etc. within each volumetric sub-area of a particular space.

People counting, such as in high-density scenarios, may be performed by regression-based counting to estimate crowd size directly. For sparsely populated rooms, object detection models like YOLO (You Only Look Once) or Faster R-CNN can be employed for precise headcount estimation.

HVAC Control Integration:

The occupancy data is transmitted to an HVAC control unit equipped with a programmable logic controller (PLC). Control algorithms are employed to adjust HVAC parameters, such as air temperature, ventilation rate, and humidity, based on occupancy levels. Fan speed and mode settings may also be adjusted by the control algorithms.

The control system also factors in environmental conditions like external temperature and air quality. Environmental sensors (e.g., including the air analysis device described herein) may monitor real-time metrics such as temperature, $CO_2$ levels, and humidity. Data from these sensors is fed back into the system, enabling adaptive control and improving model predictions over time through reinforcement learning techniques.

The devices systems and methods described herein may interface with HVAC systems by employing a specialized HVAC interface hardware module configured to receive command instructions from the devices, systems, and methods described herein, and to correspondingly control the HVAC system to which the specialized HVAC interface hardware module is connected to or in communication with.

The specialized HVAC interface hardware module is a hardware solution designed to enable seamless integration between HVAC systems and external building automation or control systems, such as BACnet, Modbus, KNX, or proprietary protocols, as described herein. It acts as a communication bridge, facilitating real-time data exchange and control functionalities while ensuring compatibility with various HVAC brands and models.

The specialized HVAC interface hardware module may include a communication interface, such as a wired or wireless communication interface. The communication interface supports multiple communication protocols, both on the HVAC side and the building automation system (BAS) side, ensuring interoperability with various HVAC protocols.

The HVAC protocols include, for example, BAS Protocols, BACnet/IP or BACnet MS/TP, Modbus RTU or Modbus TCP, or KNX.

The specialized HVAC interface hardware module may include communication ports including RS-485, Ethernet, and serial connections, for example.

The specialized HVAC interface hardware module includes a power supply, such as a power supply operating on a low-voltage DC supply (e.g., 12V-24V), compatible with standard building systems.

The specialized HVAC interface hardware module may include I/O capabilities including digital inputs/outputs for monitoring and controlling auxiliary devices such as fans, dampers, or relays.

The specialized HVAC interface hardware module functionality involves translating commands and data between the HVAC system's native protocol and the chosen BAS protocol, or any other specialized protocols, as described herein.

The specialized HVAC interface hardware module supports bidirectional communication to send or receive control commands (e.g., power on/off, set temperature, fan speed), and receive status updates (e.g., current temperature, operating mode, error codes).

The specialized HVAC interface hardware module includes network integration, such as ethernet-based models enabling remote management and monitoring via TCP/IP networks. Cloud connectivity features allow for integration with IoT platforms, supporting remote diagnostics and predictive maintenance.

The specialized HVAC interface hardware module employs diagnostics and monitoring including built-in diagnostics tools to provide real-time status information, such as communication health, error detection, and operational logs.

LED indicators on the specialized HVAC interface hardware module show power, communication, and fault states for quick troubleshooting.

The specialized HVAC interface hardware module and the devices, systems, and methods described herein support connection to multiple indoor HVAC units or zones through master-slave configurations or multi-controller setups. Modular design allows for system expansion to accommodate additional units or future upgrades.

The devices, systems, and methods described herein may be applied in Building Automation Systems (BAS) to enable centralized control and monitoring of HVAC systems within commercial buildings, ensuring efficient energy management.

The devices, systems, and methods described herein may be applied in Smart Homes, such as to allow residential HVAC systems to integrate with KNX-based or other smart home ecosystems.

The devices, systems, and methods described herein may be applied in Industrial and Commercial HVAC systems to support large-scale deployments, connecting HVAC systems to supervisory control and data acquisition (SCADA) systems.

The devices, systems, and methods described herein may be applied in IoT and Cloud Integration to facilitate integration with IoT platforms for advanced analytics, energy optimization, and remote operation.

The computers described herein may interface with HVAC systems via a simplified (e.g., single) computer board connection, such as Raspberry Pi connection, or the like.

While the devices, systems, and methods described herein are primarily described as being employed in controlling HVAC systems, the devices, systems, and methods herein may similarly be employed in other applications, such as lighting control to minimize energy used while maintaining user comfort, audio system control such as music played in various spaces that can be customized for user experience while maximizing energy efficiency, and operating safety systems (e.g., traffic lights and cross-walks) within various municipalities or similar spaces to minimize energy used and maximize user safety.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A device for controlling heating, ventilation, and air conditioning (HVAC) systems, comprising:
   at least one thermal sensing camera configured to capture a plurality of images of a space to determine a temperature of the space;

a control system in communication with the at least one thermal sensing camera, including:
  a computer in communication with the at least one thermal sensing camera, wherein the computer includes at least one processor and at least one memory in communication with the at least one processor;
  a controller in communication with the computer, wherein the at least one memory stores computer instructions configured to instruct the processor to communicate with the controller; and
  a machine learning model in communication with at least one of the computer or the at least one thermal sensing camera,
  wherein the machine learning model includes an artificial neural network configured to analyze the images of the plurality of images captured by the at least one thermal sensing camera, wherein the machine learning model includes a convolutional neural network (CNN) in communication with the artificial neural network, wherein the CNN is configured to parse the images of the plurality of images to determine the temperature in the space,
  wherein the computer employs the artificial neural network of the machine learning model to determine an amount of thermogenesis for a person or people occupying the space and create a three dimensional voxel model of the space annotated with the location of the person or people occupying the space and the amount of thermogenesis for the person or people occupying the space,
  wherein the machine learning model is trained to determine the amount of heating or cooling output needed to maintain a predetermined temperature in the space by:
  training the machine learning model on a first data set to determine the amount of heating or cooling output needed to maintain a predetermined temperature in the space based on the amount of thermogenesis for the person or people occupying the space; and
  iteratively training the machine learning model on at least a second data set and a third data set to determine the amount of heating or cooling output needed to maintain the predetermined temperature in the space based on the amount of thermogenesis for the person or people occupying the space, wherein iteratively training the machine learning model on at least the second data set and the third data set increases predictive accuracy of the machine learning model with respect to training the machine learning model on the first data set,
  wherein the amount of heating or cooling output needed to maintain the predetermined temperature in the space is determined by employing the iteratively trained machine learning model,
  wherein the iteratively trained machine learning model is configured to determine a number of people occupying the space,
  wherein the controller is configured to communicate with a heating, ventilation, and air conditioning (HVAC) system, wherein the HVAC system is configured to control the temperature in the space by heating or cooling the space, wherein the controller is configured to transmit the determined amount of heating or cooling output needed to maintain the predetermined temperature in the space to the HVAC system to maintain the predetermined temperature in the space.

2. The device of claim 1, further including a temperature sensor in communication with the computer, wherein the temperature sensor is configured to directly measure the current temperature in the space.

3. The device of claim 2, wherein the temperature sensor is a digital temperature sensor, an analog temperature sensor, a thermocouple, a resistance temperature detector, a USB temperature sensor, a WiFi® temperature sensor, or a Bluetooth® temperature sensor.

4. The device of claim 1, wherein the iteratively trained machine learning model is configured to:
  detect an object or objects occupying the space;
  determine an amount of heat released by the object or objects occupying the space;
  determine an amount of heat absorbed by the object or objects occupying the space;
  determine a future temperature in the space relative to a current temperature based on the amount of heat released by the object or objects occupying the space and the amount of heat absorbed by the object or objects occupying the space; and
  determine the amount of heating or cooling output needed to maintain the predetermined temperature in the space based on the amount of heat released by the object or objects occupying the space and the amount of heat absorbed by the object or objects occupying the space.

5. The device of claim 1, wherein the at least one camera includes a camera configured to capture video images, and wherein the images of the plurality of images are part of a video image.

6. The device of claim 1, wherein the at least one thermal sensing camera includes at least one of a thermal imaging camera, an infrared camera, a thermographic camera, a laser thermometer camera, a radiometric camera, or a thermal sensor camera.

7. The device of claim 1, further including a wireless transmitter configured to connect the controller with the HVAC system.

8. The device of claim 1, wherein the controller is configured to communicate with the HVAC system by a Wi-Fi®, Bluetooth®, or cellular network connection.

9. The device of claim 1, wherein the HVAC system includes a wireless transmitter configured to communicate with the controller.

10. The device of claim 1, further including a wireless transmitter configured to communicate with a cloud-based server.

11. The device of claim 10, wherein the wireless transmitter is configured to communicate with the cloud-based server through an internet or cellular network connection.

12. The system of claim 1, wherein the number of people occupying the space is determined by the iteratively trained machine learning model by analyzing the images of the plurality of images captured by the at least one thermal sensing camera.

13. The system of claim 12, wherein the iteratively trained machine learning model is further configured to perform a 3-dimensional volumetric thermal analysis of the space by employing the images of the plurality of images captured by the at least one thermal sensing camera to determine the amount of thermogenesis for the person or people occupying the space.

* * * * *